United States Patent
Steiner et al.

(10) Patent No.: US 10,631,389 B2
(45) Date of Patent: Apr. 21, 2020

(54) WIRELESS SENSOR HAVING A LASER-RESPONSIVE ELEMENT

(71) Applicant: Lutron Technology Company LLC, Coopersburg, PA (US)

(72) Inventors: James P. Steiner, Royersford, PA (US); Greg Edward Sloan, Allentown, PA (US); Nathan A. Boring, New Tripoli, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 519 days.

(21) Appl. No.: 15/402,339

(22) Filed: Jan. 10, 2017

(65) Prior Publication Data

US 2017/0150577 A1    May 25, 2017

Related U.S. Application Data

(63) Continuation of application No. 14/731,551, filed on Jun. 5, 2015, now Pat. No. 9,572,229, which is a
(Continued)

(51) Int. Cl.
*G01J 1/02* (2006.01)
*H05B 47/11* (2020.01)
(Continued)

(52) U.S. Cl.
CPC ............... *H05B 47/11* (2020.01); *G01J 1/02* (2013.01); *G01J 1/0219* (2013.01);
(Continued)

(58) Field of Classification Search
CPC ............... H05B 37/0218; H05B 37/02; H05B 37/0272; G01J 1/02; G01J 1/0219;
(Continued)

(56) References Cited

U.S. PATENT DOCUMENTS 4,233,545 A    11/1980  Webster et al.
4,737,867 A    4/1988   Ishikawa et al.
(Continued)

FOREIGN PATENT DOCUMENTS

| WO | 96/15650 A1 | 5/1996 |
| WO | 2003/043385 A1 | 5/2003 |
| WO | 2010/010491 A2 | 1/2010 |

OTHER PUBLICATIONS

Pape, Scott "How to extend the battery life of your microcontroller based design", Jul. 26, 2006, 5 pages, XP002611419, [retrieved on Nov. 25, 2010], retrieved from the Internet<URL: http://www.eetimes.com/design/other/4006683/ContenrItem_D4D08059_689F_44CE_8B54_56483005185A>.
(Continued)

*Primary Examiner* — Georgia Y Epps
*Assistant Examiner* — Don J Williams
(74) *Attorney, Agent, or Firm* — Philip Smith; Glen Farbanish; Amy Yanek

(57) ABSTRACT

A wireless battery-powered daylight sensor for measuring a total light intensity in a space is operable to transmit wireless signals using a variable transmission rate that is dependent upon the total light intensity in the space. The sensor comprises a photosensitive circuit, a wireless transmitter for transmitting the wireless signals, a controller coupled to the photosensitive circuit and the wireless transmitter, and a battery for powering the photosensitive circuit, the wireless transmitter, and the controller. The photosensitive circuit is operable to generate a light intensity control signal in response to the total light intensity in the space. The controller transmits the wireless signals in response to the light intensity control signal using the variable transmission rate that is dependent upon the total light intensity in the space. The variable transmission rate may be dependent upon an amount of change of the total light intensity in the space. In
(Continued)

addition, the variable transmission rate may be further dependent upon a rate of change of the total light intensity in the space.

16 Claims, 19 Drawing Sheets

Related U.S. Application Data continuation of application No. 14/219,402, filed on Mar. 19, 2014, now Pat. No. 9,089,013, which is a continuation of application No. 13/875,434, filed on May 2, 2013, now Pat. No. 8,723,447, which is a continuation of application No. 12/727,956, filed on Mar. 19, 2010, now Pat. No. 8,451,116.

(60) Provisional application No. 61/174,322, filed on Apr. 30, 2009, provisional application No. 61/285,628, filed on Dec. 11, 2009, provisional application No. 61/164,098, filed on Mar. 27, 2009.

(51) Int. Cl.
*G01J 1/16* (2006.01)
*G01J 1/32* (2006.01)
*H05B 47/10* (2020.01)
*H05B 47/19* (2020.01)
*G01J 1/44* (2006.01)

(52) U.S. Cl.
CPC ........... *G01J 1/0228* (2013.01); *G01J 1/0247* (2013.01); *G01J 1/16* (2013.01); *G01J 1/32* (2013.01); *G01J 1/44* (2013.01); *H05B 47/10* (2020.01); *H05B 47/19* (2020.01); *Y02B 20/46* (2013.01)

(58) Field of Classification Search
CPC .......... G01J 1/0228; G01J 1/0247; G01J 1/16; G01J 1/32; G01J 1/44; Y02B 20/46
See application file for complete search history.

(56) References Cited

U.S. PATENT DOCUMENTS

| | | |
|---|---|---|
| 5,736,965 A | 4/1998 | Mosebrook et al. |
| 5,838,226 A | 11/1998 | Houggy et al. |
| 5,848,054 A | 12/1998 | Mosebrook et al. |
| 5,905,442 A | 5/1999 | Mosebrook et al. |
| 5,962,989 A | 10/1999 | Baker |
| 5,982,103 A | 11/1999 | Mosebrook et al. |
| 6,340,864 B1 | 1/2002 | Wacyk |
| 6,583,573 B2 | 6/2003 | Bierman |
| 6,687,487 B1 | 2/2004 | Mosebrook et al. |
| 6,803,728 B2 | 10/2004 | Balasubramaniam et al. |
| 7,024,119 B1 | 4/2006 | Mier-Langner et al. |
| 7,027,736 B1 | 4/2006 | Mier-Langner et al. |
| 7,045,968 B1 | 5/2006 | Bierman et al. |
| 7,111,952 B2 | 9/2006 | Veskovic |
| 7,190,126 B1 | 3/2007 | Paton |
| 7,193,201 B2 | 3/2007 | Motte |
| 7,211,968 B2 | 5/2007 | Adamson et al. |
| 7,277,930 B2 | 10/2007 | Hillis et al. |
| 7,301,477 B2 | 11/2007 | Isoyama et al. |
| 7,369,060 B2 | 5/2008 | Veskovic et al. |
| 7,518,715 B1 * | 4/2009 | Hamilton, II ............ G01J 1/02 315/291 |
| 7,573,208 B2 | 8/2009 | Newman, Jr. |
| 7,646,029 B2 | 1/2010 | Mueller et al. |
| 7,940,167 B2 | 5/2011 | Steiner et al. |
| 8,009,042 B2 | 8/2011 | Steiner et al. |
| 8,033,686 B2 | 10/2011 | Recker et al. |
| 8,189,011 B2 * | 5/2012 | Van de Sluis ..... H05B 37/0272 345/156 |
| 8,199,010 B2 | 6/2012 | Sloan et al. |
| 8,228,184 B2 | 7/2012 | Blakeley et al. |
| 8,410,706 B2 | 4/2013 | Steiner et al. |
| 8,451,116 B2 | 5/2013 | Steiner et al. |
| 8,723,447 B2 | 5/2014 | Steiner |
| 8,760,293 B2 | 6/2014 | Steiner |
| 9,089,013 B2 | 7/2015 | Steiner |
| 2003/0178554 A1 | 9/2003 | Zak |
| 2004/0071471 A1 | 4/2004 | Baker et al. |
| 2005/0110416 A1 | 5/2005 | Veskovic |
| 2005/0264415 A1 | 12/2005 | Katz |
| 2006/0091822 A1 | 5/2006 | Bierman et al. |
| 2008/0017726 A1 | 1/2008 | Neumann |
| 2008/0111491 A1 | 5/2008 | Spira |
| 2008/0291006 A1 | 11/2008 | Kang et al. |
| 2009/0174658 A1 | 7/2009 | Blatchley et al. |
| 2009/0206983 A1 | 8/2009 | Knode et al. |
| 2009/0251352 A1 | 10/2009 | Altonen et al. |
| 2010/0052574 A1 | 3/2010 | Blakeley et al. |
| 2010/0052576 A1 | 3/2010 | Steiner et al. |
| 2010/0052894 A1 | 3/2010 | Steiner et al. |
| 2010/0207759 A1 | 8/2010 | Sloan et al. |
| 2010/0244706 A1 | 9/2010 | Steiner et al. |
| 2012/0281606 A1 | 11/2012 | Cooney et al. |

OTHER PUBLICATIONS

Somfy Systems, Inc., Sunis Indoor Wirefree RTS Sun Sensor Brochure, Feb. 2009, 2 pages.
Somfy Systems, Inc., Sunis Wirefree RTS Light Sensor Programming/Operating/Installation Instructions, Feb. 2009, 4 pages.
European Patent Office, International Search Report and Written Opinion for International Patent Application No. PCT/US2010/028298, dated Dec. 13, 2010, 19 pages.
USPTO, Office Action for U.S. Appl. No. 14/721,236, filed Apr. 12, 2016, 14 pages.

* cited by examiner

WIRELESS SENSOR HAVING A LASER-RESPONSIVE ELEMENT

CROSS-REFERENCE TO RELATED APPLICATIONS

This application is a continuation of commonly-assigned U.S. patent application Ser. No. 14/731,551, filed Jun. 5, 2015, entitled WIRELESS SENSOR HAVING A CONTROLLABLE PHOTOSENSITIVE CIRCUIT, which is a continuation application of U.S. patent application Ser. No. 14/219,402, filed Mar. 19, 2014, now U.S. Pat. No. 9,089,013, issued Jul. 21, 2015, entitled WIRELESS SENSOR HAVING A VARIABLE TRANSMISSION RATE, which is a continuation application of U.S. patent application Ser. No. 13/875,434, filed May 2, 2013, now U.S. Pat. No. 8,723,447, issued May 13, 2014, entitled WIRELESS BATTERY-POWERED DAYLIGHT SENSOR, which is a continuation application of U.S. patent application Ser. No. 12/727,956, filed Mar. 19, 2010, now U.S. Pat. No. 8,451,116, issued May 28, 2013, entitled WIRELESS BATTERY-POWERED DAYLIGHT SENSOR, which is a non-provisional application of U.S. Provisional Patent Application Ser. No. 61/164,098, filed Mar. 27, 2009, entitled METHOD OF CALIBRATING A DAYLIGHT SENSOR; U.S. Provisional Patent Application Ser. No. 61/174,322, filed Apr. 30, 2009, entitled WIRELESS BATTERY-POWERED DAYLIGHT SENSOR; and U.S. Provisional Patent Application Ser. No. 61/285,628, filed Dec. 11, 2009, entitled WIRELESS BATTERY-POWERED DAYLIGHT SENSOR. The entire disclosures of each of these non-provisional and provisional patent applications are hereby incorporated by reference.

BACKGROUND OF THE INVENTION

Field of the Invention

The present invention relates to daylight sensors for measuring the ambient light level (i.e., the total light intensity) in a space, and more particularly, to a lighting control system having a lighting control device (such as a dimmer switch) and a wireless, battery-powered daylight sensor.

Description of the Related Art

Many rooms in both residential and commercial buildings are illuminated by both artificial light from a lighting load, such as an incandescent lamp or a fluorescent lamp, and daylight (i.e., sunlight) shining through a window. Daylight sensors (i.e., photosensors) are often used to measure the total light intensity in a space in order to adjust the light intensity of the lighting load to thus adjust the total light intensity in the space. For example, the light intensity of the lighting load may be decreased as the total light intensity increases, and vice versa. Daylight sensors are typically mounted to a ceiling in the space at a distance from the window. Since electrical wires (for power and communication) are typically not located near the position on the ceiling to which the daylight sensor must be mounted, it is desirable that the daylight sensor be "wireless" in order to avoid the need to run electrical wires to the daylight sensor (for example, in a retro-fit installation). Therefore, there is a need for a battery-powered daylight sensor that is able to communicate wirelessly with a load control device, such as a dimmer switch.

SUMMARY OF THE INVENTION

According to an embodiment of the present invention, a wireless battery-powered daylight sensor for measuring a total light intensity in a space is operable to transmit wireless signals using a variable transmission rate that is dependent upon the total light intensity in the space. The sensor comprises a photosensitive circuit, a wireless transmitter for transmitting the wireless signals, a controller coupled to the photosensitive circuit and the wireless transmitter, and a battery for powering the photosensitive circuit, the wireless transmitter, and the controller. The photosensitive circuit is operable to generate a light intensity control signal in response to the total light intensity in the space. The controller transmits the wireless signals in response to the light intensity control signal using the variable transmission rate that is dependent upon the total light intensity in the space. The variable transmission rate may be dependent upon an amount of change of the total light intensity in the space. In addition, the variable transmission rate may be further dependent upon a rate of change of the total light intensity in the space.

According to another embodiment of the present invention, a wireless battery-powered daylight sensor for measuring a total light intensity in a space comprises a photosensitive circuit operable to generate a light intensity control signal in response to the total light intensity in the space, a wireless transmitter for transmitting wireless signals, a controller coupled to the photosensitive circuit and the wireless transmitter, and a battery for powering the photosensitive circuit, the wireless transmitter, and the controller. The controller is operable to transmit a wireless signal in response to the light intensity control signal, and is operable to disable the photosensitive circuit, such that the photosensitive circuit does not draw current from the battery. In addition, the photosensitive circuit may comprise a photosensitive diode for conducting a photosensitive diode current having a magnitude responsive to the light intensity in the space, where the magnitude of the light intensity control signal is responsive to the magnitude of the photosensitive diode current. The photosensitive circuit may further comprise a controllable switch coupled in series with the photosensitive diode, such that the photosensitive diode conducts the photosensitive diode current when the switch is closed. The controller may be coupled to the switch for opening the switch, such that the photosensitive diode does not conduct the photosensitive diode current and the photosensitive circuit is disabled.

According to yet another embodiment of the present invention, a wireless battery-powered daylight sensor for measuring a total light intensity in a space operates as part of a lighting control system that comprises a dimmer switch for controlling the amount of power delivered to a lighting load. The sensor comprises a photosensitive circuit operable to generate a light intensity control signal in response to the total light intensity in the space, a wireless transmitter for transmitting wireless signals, a controller coupled to the photosensitive circuit and the wireless transmitter, and a battery for powering the photosensitive circuit, the wireless transmitter, and the controller. The controller is operable to determine, in response to the light intensity control signal, a new light intensity to which the dimmer switch should control the intensity of the lighting load. The controller is further operable to enable the wireless transmitter and to transmit to the dimmer switch a wireless signal including a command that includes the new light intensity for the lighting load if the new light intensity differs from a present light intensity of the lighting load by a predetermined increment.

According to another aspect of the present invention, a wireless battery-powered daylight sensor for measuring a total light intensity in a space comprises a photosensitive circuit operable to generate a light intensity control signal in response to the total light intensity in the space, a wireless transceiver for transmitting and receiving wireless signals, a laser pointer circuit adapted to be exposed to light from a laser pointer, a controller coupled to the photosensitive circuit, the wireless transceiver, and the laser pointer circuit, and a battery for powering the photosensitive circuit, the wireless transceiver, and the controller. The controller is operable to transmit a wireless signal in response to the light intensity control signal. The controller is further operable to enable the wireless transceiver in response to light from a laser pointer shining on the laser pointer circuit, and to subsequently receive a wireless signal.

Other features and advantages of the present invention will become apparent from the following description of the invention that refers to the accompanying drawings.

BRIEF DESCRIPTION OF THE DRAWINGS

The invention will now be described in greater detail in the following detailed description with reference to the drawings in which.

DETAILED DESCRIPTION OF THE INVENTION

Figure 1:
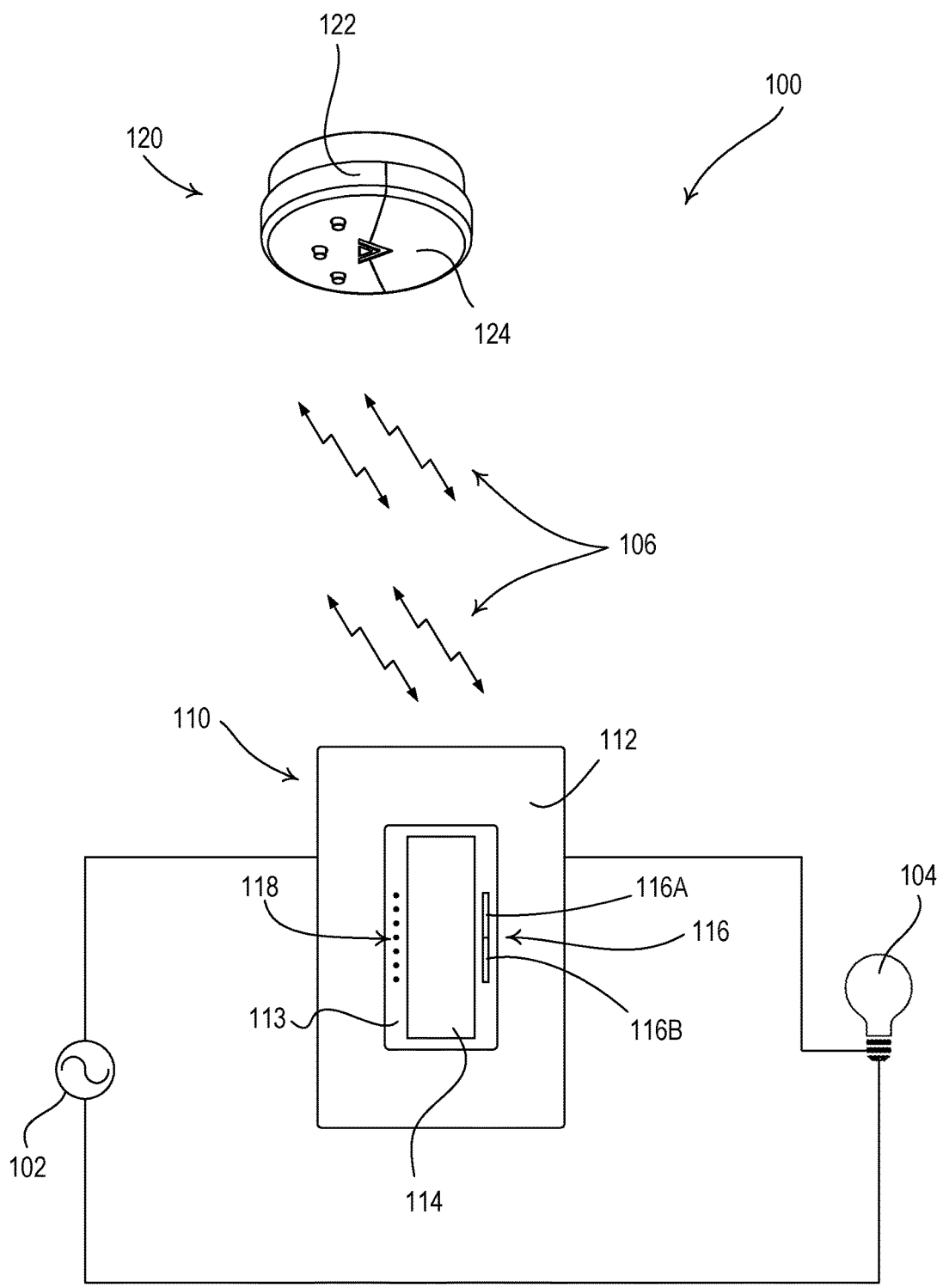
FIG. 1 is a simple diagram of a radio-frequency (RF) lighting control system comprising a dimmer switch and a daylight sensor according to the present invention.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a simple diagram of a radio-frequency (RF) lighting control system 100 comprising a dimmer switch 110 and a daylight sensor 120 according to a first embodiment of the present invention. The dimmer switch 110 is adapted to be coupled in series electrical connection between an alternating-current (AC) power source 102 and a lighting load 104 for controlling the amount of power delivered to the lighting load. The dimmer switch 110 may be wall-mounted in a standard electrical wallbox. Alternatively, the dimmer switch 110 could be implemented as a table-top load control device. The dimmer switch 110 comprises a faceplate 112 and a bezel 113 received in an opening of the faceplate. The dimmer switch 110 further comprises a control actuator 114 (i.e., a button) and an intensity adjustment actuator 116. Successive actuations of the toggle actuator 114 toggle, i.e., turn off and on, the lighting load 104. Actuations of an upper portion 116A or a lower portion 116B of the intensity adjustment actuator 116 respectively increase or decrease the amount of power delivered to the lighting load 104 and thus increase or decrease a present light intensity $L_{PRES}$ of the lighting load 104 from a minimum intensity (e.g., 1%) to a maximum intensity (e.g., 100%). A plurality of visual indicators 118, e.g., light-emitting diodes (LEDs), are arranged in a linear array on the left side of the bezel 113. The visual indicators 118 are illuminated to provide feedback of the intensity of the lighting load 104. An example of a dimmer switch having a toggle actuator 114 and an intensity adjustment actuator 116 is described in greater detail in U.S. Pat. No. 5,248,919, issued Sep. 29, 1993, entitled LIGHTING CONTROL DEVICE, the entire disclosure of which is hereby incorporated by reference.

The daylight sensor 120 is mounted so as to measure a total light intensity $L_{T\text{-}SNSR}$ in the space around the daylight sensor (i.e., in the vicinity of the lighting load 104 controlled by the dimmer switch 110). The daylight sensor 120 includes an internal photosensitive circuit, e.g., a photosensitive diode 232 (FIG. 6A), which is housed in an enclosure 122 having a lens 124 for conducting light from outside the daylight sensor towards the internal photosensitive diode 232. The daylight sensor 120 is responsive to the total light intensity $L_{T\text{-}SNSR}$ measured by the internal photosensitive circuit. Specifically, the daylight sensor 120 is operable to wirelessly transmit digital messages (i.e., wireless signals) to the dimmer switch 110 via RF signals 106, such that the dimmer switch 110 controls the present light intensity $L_{PRES}$ of the lighting load 104 in response to the total light intensity $L_{T\text{-}SNSR}$ measured by the daylight sensor 120.

During a setup procedure of the RF lighting control system 100, the daylight sensor 120 may be assigned to (i.e., associated with) the dimmer switch 110. As mentioned above, the daylight sensor 120 transmits digital messages wirelessly via the RF signals 106 to the dimmer switch 110 in response to the total light intensity $L_{T\text{-}SNSR}$ measured by the daylight sensor. A digital message transmitted by the daylight sensor 120 includes, for example, identifying information, such as, a serial number (i.e., a unique identifier) associated with the daylight sensor. The dimmer switch 110 is responsive to messages containing the serial numbers of the daylight sensor 120 to which the dimmer switch is assigned. Each digital message may further comprise a value representative of the measured total light intensity $L_{T\text{-}SNSR}$ measured by the daylight sensor 120 (e.g., in foot-candles). Accordingly, the dimmer switch 110 controls the present light intensity $L_{PRES}$ of the lighting load 104 in response to receiving a digital message with the total light intensity $L_{T\text{-}SNSR}$ as measured by the daylight sensor 120. According to the present invention, the daylight sensor 120 is operable to transmit digital messages to the dimmer switch 110 using a variable transmission rate $f_{TX}$ that is dependent upon the measured total light intensity $L_{T\text{-}SNSR}$, such that the daylight sensor 120 only transmits digital messages when needed (as will be described in greater detail below).

Examples of RF lighting control systems are described in greater detail in U.S. patent application Ser. No. 12/033,223, filed Feb. 19, 2008, entitled COMMUNICATION PROTOCOL FOR A RADIO-FREQUENCY LOAD CONTROL SYSTEM; U.S. patent application Ser. No. 12/203,518, filed Sep. 3, 2008, entitled RADIO-FREQUENCY LIGHTING CONTROL SYSTEM WITH OCCUPANCY SENSING; U.S. patent application Ser. No. 12/203,500, filed Sep. 3, 2008, entitled BATTERY-POWERED OCCUPANCY SENSOR; and U.S. patent application Ser. No. 12/371,027, filed Feb. 13, 2009, entitled METHOD AND APPARATUS FOR CONFIGURING A WIRELESS SENSOR, the entire disclosures of which are hereby incorporated by reference.

Alternatively, the dimmer switch 110 could be replaced with an electronic switch comprising, for example, a relay, for simply toggling the lighting load 104 on and off. The electronic switch could be adapted to simply turn the lighting load 104 on when the measured total light intensity $L_{T\text{-}SNSR}$ drops below a predetermined threshold and turn the lighting load 104 off when the measured total light intensity $L_{T\text{-}SNSR}$ rises above approximately the predetermined threshold (e.g., using some hysteresis).

The lighting control system 100 could additionally comprise one or more motorized window treatments, such as roller shades, draperies, Roman shades, or blinds, for controlling the amount of daylight entering the space around the daylight sensor 120. Examples of load control systems having motorized window treatments are described in greater detail in U.S. Pat. No. 7,111,952, issued Sep. 26, 2006, entitled SYSTEM TO CONTROL DAYLIGHT AND ARTIFICIAL ILLUMINATION AND SUN GLARE IN A SPACE, the entire disclosure of which is hereby incorporated by reference.

Figure 2:
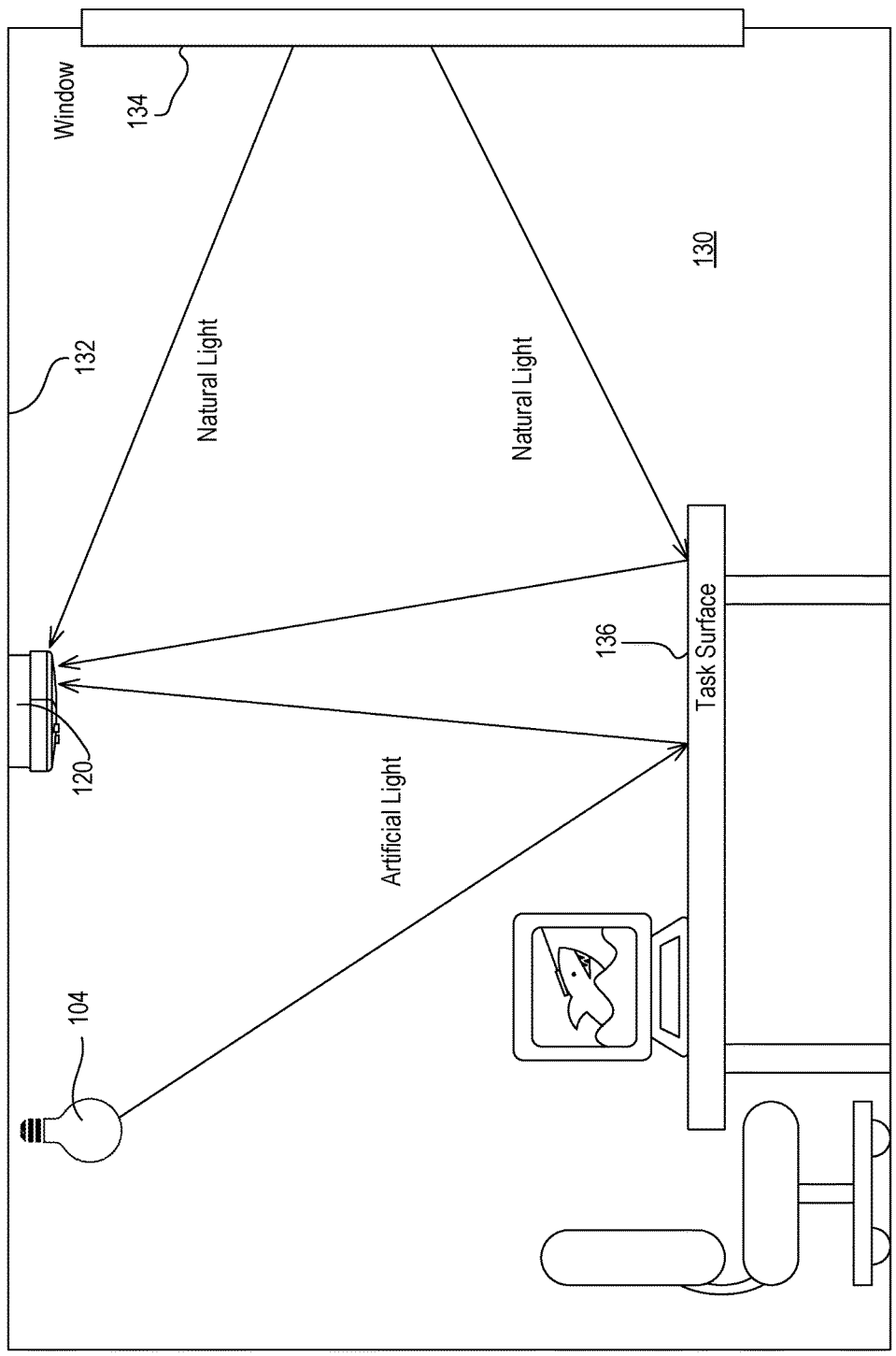
FIG. 2 is a simplified diagram of a room in which the daylight sensor of FIG. 1 may be mounted.

FIG. 2 is a simplified diagram of a room 130 in which the daylight sensor 120 may be mounted. The daylight sensor 120 is mounted to a ceiling 132 of the room 130 at a distance from a window 134 through which natural light (i.e., daylight) shines. The lighting load 104 is also mounted to the ceiling 132 of the room. The room 130 contains a task surface 136 (e.g., a table) that is illuminated by the natural light shining through the window 134 and the electric light (i.e., artificial light) generated by the lighting load 104. Thus, a total light intensity $L_{T\text{-}TASK}$ produced on the task surface 136 is the sum of a light intensity $L_{D\text{-}TASK}$ on the task surface from only daylight entering the room 130 through the window 134 and a light intensity $L_{E\text{-}TASK}$ on the task surface from only the lighting load 104 (i.e., $L_{T\text{-}TASK} = L_{D\text{-}TASK} + L_{E\text{-}TASK}$). The daylight sensor 120 is operable to measure the total light intensity $L_{T\text{-}SNSR}$ at the daylight sensor, which is also a combination of the natural light and the electric light in the room 130. The natural and electric light that shine onto the task surface 136 may be reflected to the daylight sensor 120, while the natural light from the window 134 may shine directly onto the daylight sensor. Thus, the total light intensity $L_{T\text{-}SNSR}$ measured by the daylight sensor 120 is the sum of a light intensity $L_{D\text{-}SNSR}$ at the daylight sensor from only daylight entering the room 130 through the window 134 and a light intensity $L_{E\text{-}SNSR}$ at the daylight sensor from only the lighting load 104 (i.e., $L_{T\text{-}SNSR} = L_{D\text{-}SNSR} + L_{E\text{-}SNSR}$).

The dimmer switch 110 adjusts the present light intensity $L_{PRES}$ of the lighting load 104 so as to control the total light intensity $L_{T\text{-}TASK}$ on the task surface 136 towards a target total task surface light intensity $L_{TRGT\text{-}TASK}$. For example, the target total task surface light intensity $L_{TRGT\text{-}TASK}$ may be preset to be approximately fifty foot-candles. In addition, the target total task surface light intensity $L_{TRGT\text{-}TASK}$ may be decreased by actuating the intensity adjustment actuator 116. Alternatively, the dimmer switch 110 could be operable to receive one or more digital messages from an advanced programming device, such as a personal digital assistant (PDA) or a personal computer (PC), such that the target total task surface light intensity $L_{TRGT\text{-}TASK}$ may be entered using a graphical user interface (GUI) and transmitted to the dimmer switch 110. Further, the target total task surface light intensity $L_{TRGT\text{-}TASK}$ could alternatively be adjusted using an advanced programming mode of the dimmer switch 110. An example of an advanced programming mode for a dimmer switch is described in greater detail in U.S. Pat. No. 7,190,125, issued Mar. 13, 2007, entitled PROGRAMMABLE WALLBOX DIMMER, the entire disclosure of which is hereby incorporated by reference.

Since the total light intensity $L_{T\text{-}SNSR}$ measured by the daylight sensor 120 (e.g., as reflected on the daylight sensor) is less than the total light intensity $L_{T\text{-}TASK}$ shining directly on the task surface 136, the lighting control system 100 is characterized by one or more gains. Specifically, the dimmer switch 110 uses a daylight gain $G_D$ and an electrical light gain $G_E$ to control the present intensity $L_{PRES}$ of the lighting load 104. The daylight gain $G_D$ is representative of the ratio between the light intensity $L_{D\text{-}TASK}$ on the task surface 136 from only daylight and the light intensity $L_{D\text{-}SNSR}$ measured by the daylight sensor 120 from only daylight (i.e., $G_D = L_{D\text{-}TASK}/L_{D\text{-}SNSR}$). The electric light gain $G_E$ is representative of the ratio between the light intensity $L_{E\text{-}TASK}$ on the task surface 136 from only the lighting load 104 and the light intensity $L_{E\text{-}SNSR}$ measured by the daylight sensor 120 from only the lighting load (i.e., $G_E = L_{E\text{-}TASK}/L_{E\text{-}SNSR}$). The daylight gain $G_D$ and the electrical light gain $G_E$ of the lighting control system 100 are set during a gain calibration procedure. An example of a gain calibration procedures are described in greater detail in commonly-assigned, co-pending U.S. patent application Ser. No. 12/727,923, filed Mar. 19, 2010, entitled METHOD OF CALIBRATING A DAYLIGHT SENSOR, the entire disclosure of which is hereby incorporated by reference.

Figure 3:
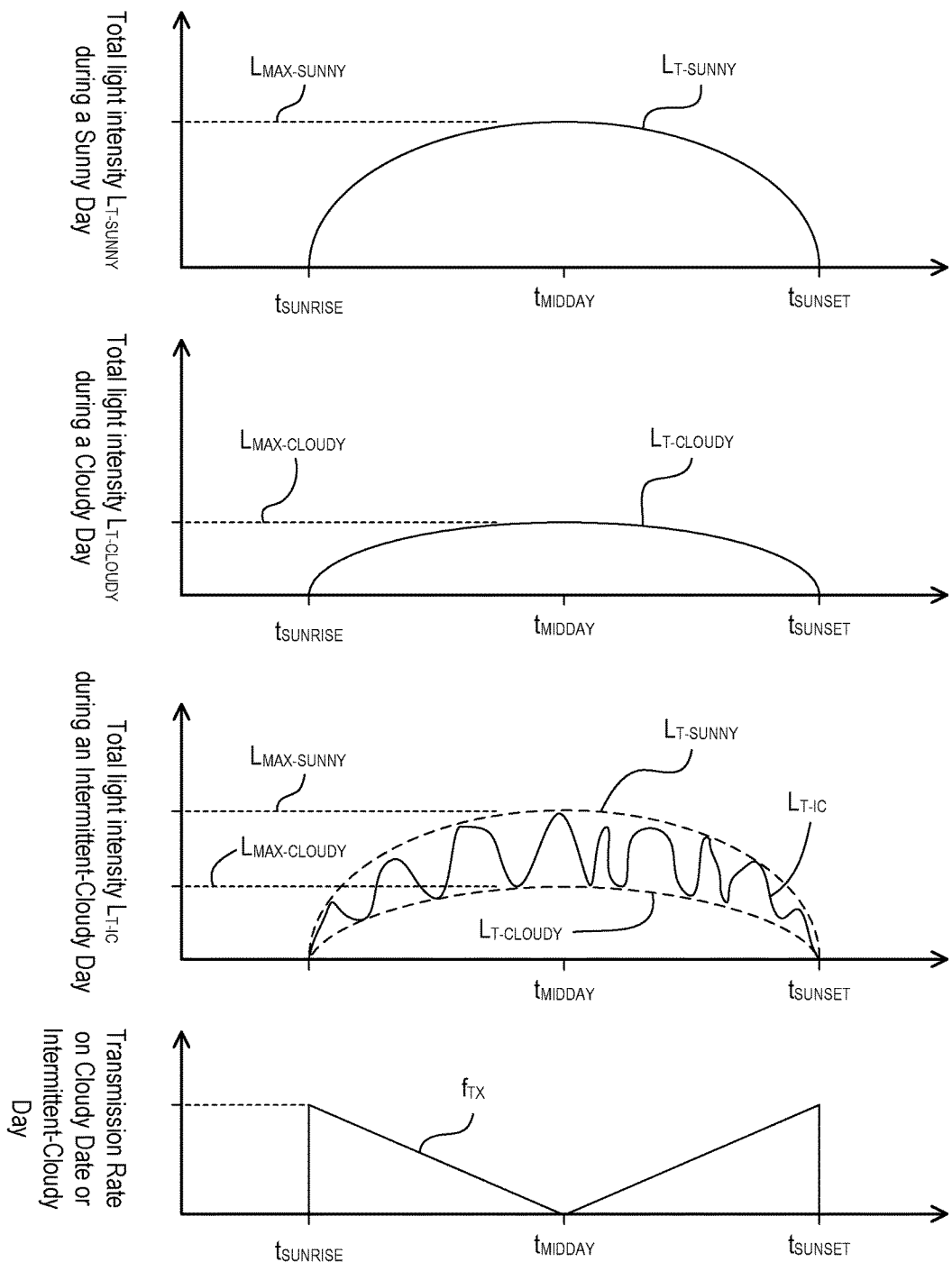
FIG. 3 shows a few example plots of total light intensities at the daylight sensor mounted in the room of FIG. 2 with respect to time during a sunny day, a cloudy day, and an intermittent-cloudy day.

During days when there are intermittent clouds passing the building in which the room 130 is located, the total light intensity $L_{T\text{-}SNSR}$ at the daylight sensor 120 may fluctuate between high values when the clouds are not blocking the sunlight and low values when the clouds are blocking the sunlight. FIG. 3 shows a few example plots of the total light intensity $L_{T\text{-}SNSR}$ as measured by the daylight sensor 120 with respect to time during a sunny day, a cloudy day, and an intermittent-cloudy day. The total light intensity $L_{T\text{-}SNSR}$ during a day typically takes the shape of a parabola. On a sunny day, a total sunny-day light intensity $L_{T\text{-}SUNNY}$ may increase from sunrise (at time $t_{SUNRISE}$) to a maximum sunny-day light intensity $L_{MAX\text{-}SUNNY}$ around midday (at time $t_{MIDDAY}$), and then decrease until sunset (at time $t_{SUNSET}$). On a cloudy day, a total cloudy-day light intensity $L_{T\text{-}CLOUDY}$ may increase from sunrise to a maximum cloudy-day light intensity $L_{MAX\text{-}CLOUDY}$ around midday, and then decreases until sunset. The maximum sunny-day light intensity $L_{MAX\text{-}SUNNY}$ is typically greater than the maximum cloudy-day light intensity $L_{MAX\text{-}CLOUDY}$. On a day having intermittent clouds, a total light intensity $L_{T\text{-}IC}$ may fluctuate between the total cloudy-day light intensity $L_{T\text{-}CLOUDY}$ and the total sunny-day light intensity $L_{T\text{-}SUNNY}$ as shown in FIG. 3.

Figure 4:
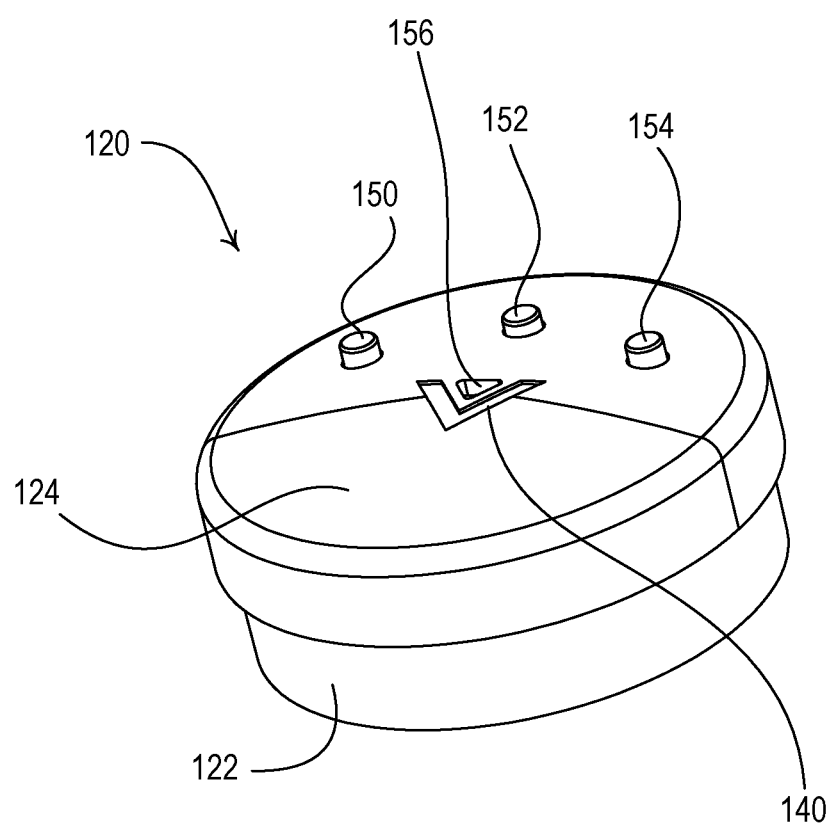
FIG. 4 is an enlarged perspective view of the daylight sensor of FIG. 1.

FIG. 4 is an enlarged perspective view of the daylight sensor 120. The lens 124 is transparent such that the light from the room 130 is able to shine onto the internal photosensitive diode 232 of the daylight sensor 120. The daylight sensor 120 is positioned on the ceiling 132 such that an arrow 140 points towards the window 134, such that lens 124 is directed towards the window 134. As a result, more natural light than artificial light will shine through the lens 124 and onto the internal photosensitive diode 232. A plurality of actuators (e.g., a calibration button 150, a test button 152, and a link button 154) are used during the setup and calibration procedures of the daylight sensor 120. The daylight sensor 120 further comprises a laser-pointer receiving opening 156, which is adapted to receive energy from a laser pointer (not shown). The daylight sensor 120 is responsive to the energy of the laser pointer shining through the laser-pointer receiving opening 156. When the daylight sensor 120 is mounted to the ceiling 132, a user may shine the laser pointer through the opening 156 rather than actuating the calibration button 150 during the gain calibration procedure.

Figure 5:
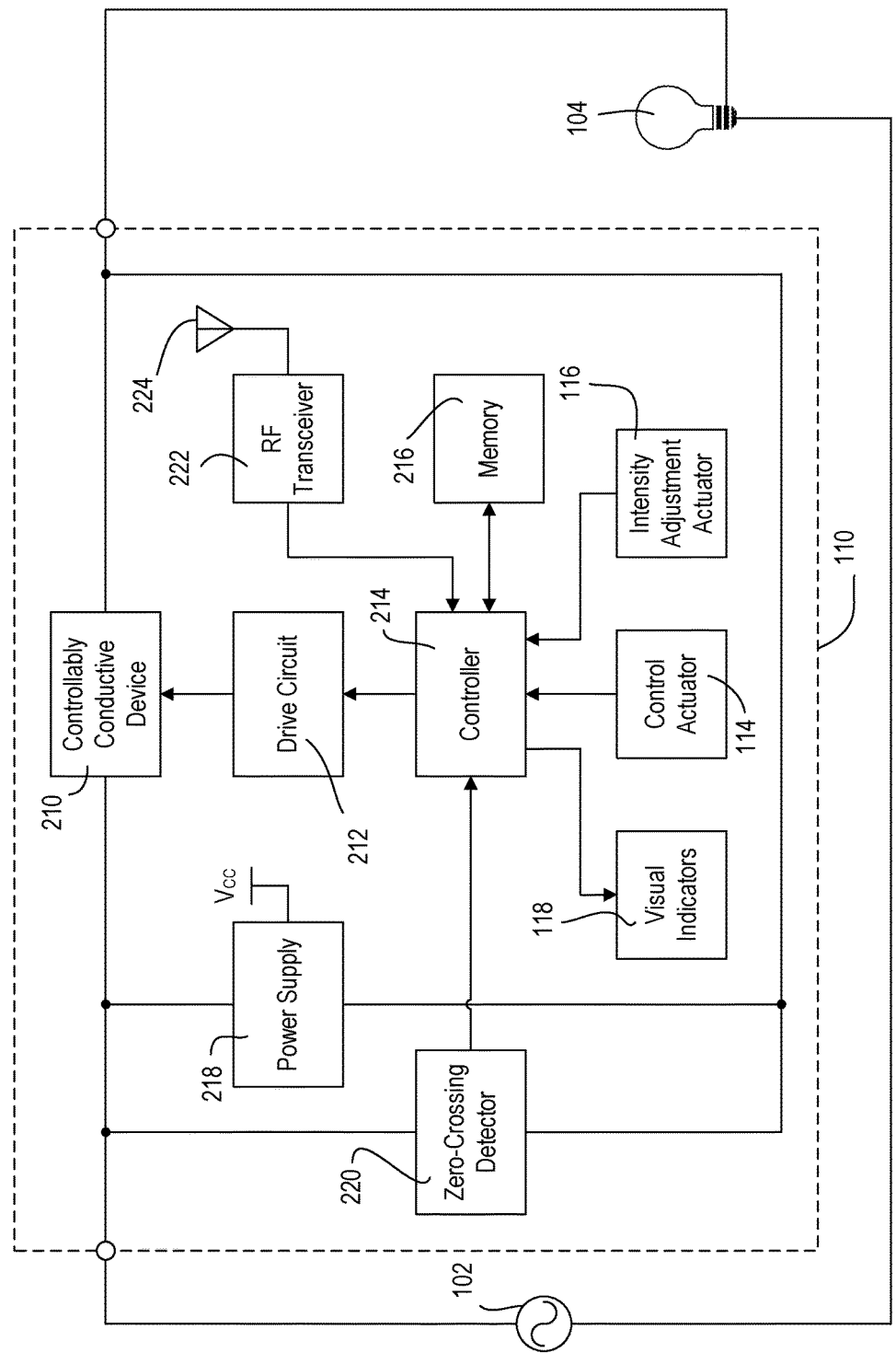
FIG. 5 is a simplified block diagram of the dimmer switch of FIG. 1.

FIG. 5 is a simplified block diagram of the dimmer switch 110. The dimmer switch 110 comprises a controllably conductive device 210 coupled in series electrical connection between the AC power source 102 and the lighting load 104 for control of the power delivered to the lighting load. The controllably conductive device 210 may comprise any suitable type of bidirectional semiconductor switch, such as, for example, a triac, a field-effect transistor (FET) in a rectifier bridge, or two FETs in anti-series connection. The controllably conductive device 210 includes a control input coupled to a drive circuit 212. The controllably conductive device 210 is rendered conductive or non-conductive in response to the control input, which in turn controls the power supplied to the lighting load 104.

The drive circuit 212 provides control inputs to the controllably conductive device 210 in response to control signals from a controller 214. The controller 214 is, for example, a microcontroller, but may alternatively be any suitable processing device, such as a programmable logic device (PLD), a microprocessor, or an application specific integrated circuit (ASIC). The controller 214 receives inputs from the control actuator 114 and the intensity adjustment actuator 116 and controls the visual indicators 118. The controller 214 is also coupled to a memory 216 for storage of the preset intensity of lighting load 104, the serial number of the daylight sensor 120 to which the dimmer switch 110 is assigned, the daylight gain $G_D$, the electrical light gain $G_E$, and other operational characteristics of the dimmer switch 110. The controller 230 may recall the daylight gain $G_D$ and the electrical light gain $G_E$ from the memory 216 at startup. The memory 216 may be implemented as an external integrated circuit (IC) or as an internal circuit of the controller 214. A power supply 218 generates a direct-current (DC) voltage $V_{CC}$ for powering the controller 214, the memory 216, and other low-voltage circuitry of the dimmer switch 110.

A zero-crossing detector 220 determines the zero-crossings of the input AC waveform from the AC power supply 102. A zero-crossing is defined as the time at which the AC supply voltage transitions from positive to negative polarity, or from negative to positive polarity, at the beginning of each half-cycle. The zero-crossing information is provided as an input to controller 214. The controller 214 provides the control signals to the drive circuit 212 to operate the controllably conductive device 210 (i.e., to provide voltage from the AC power supply 102 to the lighting load 104) at predetermined times relative to the zero-crossing points of the AC waveform using a phase-control dimming technique.

The dimmer switch 110 further comprises an RF transceiver 222 and an antenna 224 for receiving the RF signals 106 from the daylight sensor 120. The controller 214 is operable to control the controllably conductive device 210 in response to the messages received via the RF signals 106. Examples of the antenna 224 for wall-mounted dimmer switches, such as the dimmer switch 110, are described in greater detail in U.S. Pat. No. 5,982,103, issued Nov. 9, 1999, and U.S. Pat. No. 7,362,285, issued Apr. 22, 2008, both entitled COMPACT RADIO FREQUENCY TRANSMITTING AND RECEIVING ANTENNA AND CONTROL DEVICE EMPLOYING SAME. The entire disclosures of both patents are hereby incorporated by reference.

Figure 6A:
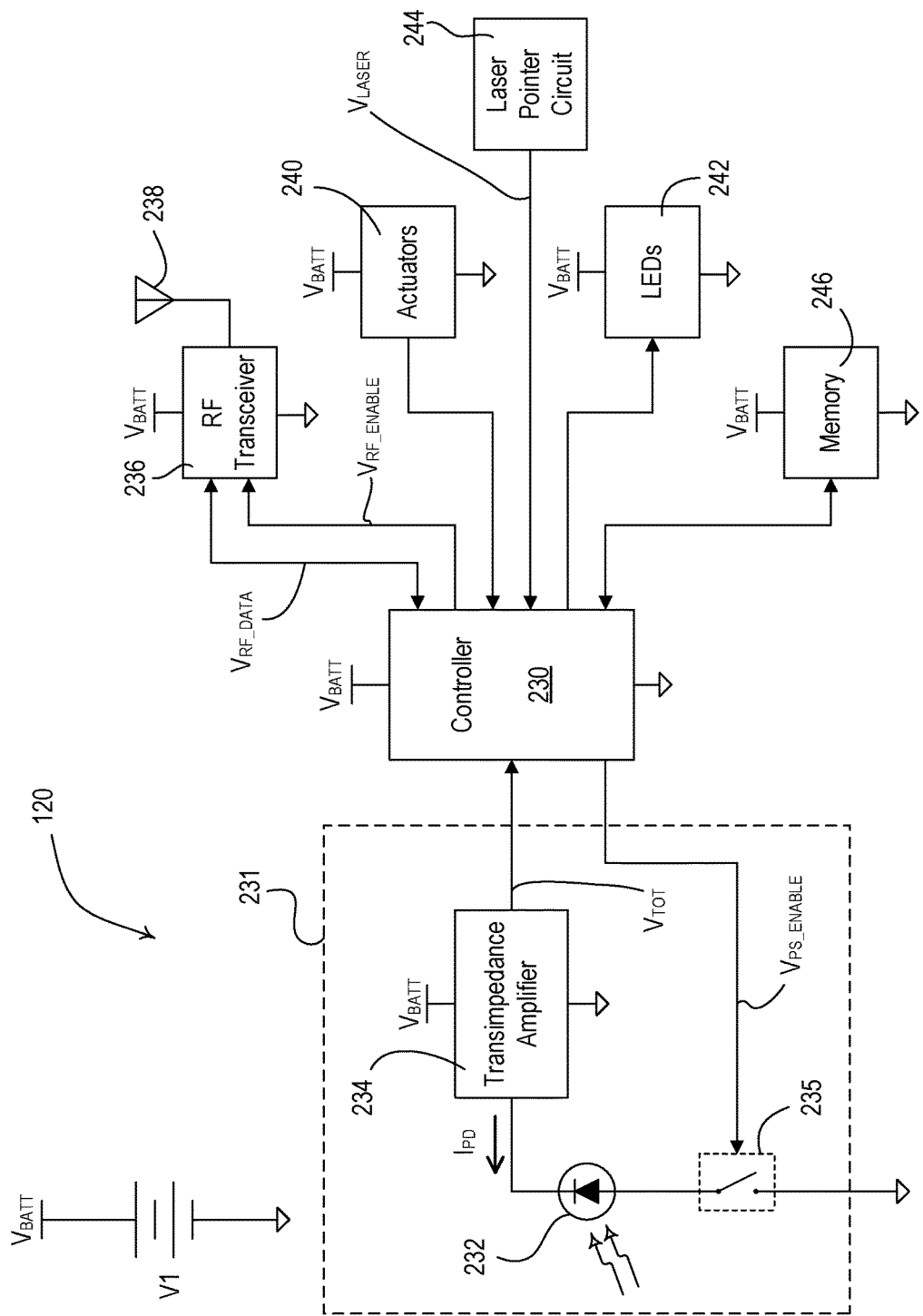
FIG. 6A is a simplified block diagram of the daylight sensor of FIG. 1.

FIG. 6A is a simplified block diagram of the daylight sensor 120. The daylight sensor 120 comprises a controller 230 that is responsive to a photosensitive circuit 231, which includes the photosensitive diode 232. The cathode of the photosensitive diode 232 is coupled to the controller 230 via a transimpedance amplifier 234, which operates as a current-to-voltage converter. The anode of the photosensitive diode 232 is coupled to circuit common through a controllable switch 235, which allows the controller 230 to enable and disable the photosensitive circuit 231 (using a photosensitive circuit enable control signal $V_{PS\_ENABLE}$) as will be described in greater detail below.

The photosensitive diode 232 conducts a photosensitive diode current $I_{PD}$ having a magnitude dependent upon the magnitude of the light that shines on the photosensitive diode (i.e., the total light intensity $L_{T-SNSR}$ as measured by the daylight sensor 120). The transimpedance amplifier 234 provides the controller 230 with a total light intensity control signal $V_{TOT}$ representative of the total light intensity $L_{T-SNSR}$. Specifically, the magnitude of the total light intensity control signal $V_{TOT}$ generated by the transimpedance amplifier 234 is dependent upon the magnitude of the current $I_{PD}$ conducted by the photosensitive diode 232, and thus the total light intensity $L_{T-SNSR}$. The controller 230 comprises an analog-to-digital converter (ADC), such that the controller is operable to sample the total light intensity control signal $V_{TOT}$ to generate a total light intensity sample $S_{TOT}$. The controller 230 uses a sampling period $T_{SMPL}$ of, for example, approximately one second, such that the controller samples the total light intensity control signal $V_{TOT}$ approximately once every second during normal operation of the daylight sensor 120.

The daylight sensor 120 further comprises an RF transceiver 236, which is coupled to the controller 230 and an antenna 238. The controller 230 is operable to cause the RF transceiver 236 to transmit digital messages to the dimmer switch 110 via the RF signals 106 in response to the magnitude of the total light intensity control signal $V_{TOT}$. The controller 230 may also be operable to receive a digital message from the dimmer switch 110 or another remote control device, such as a personal digital assistant (PDA), for configuring the operation of the daylight sensor 120. The controller 230 provides the digital message to be transmitted by the RF transceiver 236 and obtains received digital messages from the RF transmitter via an RF data control signal $V_{RF\_DATA}$. The controller 230 also is operable to enable and disable the RF transceiver via an RF enable control signal $V_{RF\_ENABLE}$. Alternatively, the RF transceiver 236 of the daylight sensor 120 could comprise an RF transmitter and the RF transceiver 222 of the dimmer switch 110 could comprise an RF receiver to allow for one-way communication between the daylight sensor and the dimmer switch. The RF transmitter may comprise, for example, part number CC1150 manufactured by Texas Instruments Inc.

The controller 230 of the daylight sensor 120 is also responsive to a plurality of actuators 240 (i.e., the calibration button 150, the test button 152, and the link button 154), which provide user inputs to the daylight sensor for use during calibration of the daylight sensor. The controller 230 is operable to control one or more LEDs 242 to illuminate the lens 124 to thus provide feedback during calibration of the daylight sensor 120. A laser pointer circuit 244 is coupled to the controller 230 and is responsive to light that shines through the laser-pointer receiving opening 156 from a laser pointer. Specifically, the controller 230 responds to an input from the laser pointer circuit 244 in the same manner as an actuation of the calibration button 150. The controller 230 is further coupled to a memory 246 for storing the operational characteristics of the daylight sensor 120. The daylight sensor 120 also comprises a battery V1 that provides a battery voltage $V_{BATT}$ (e.g., approximately three volts) for powering the controller 230, the photosensitive circuit 231, the RF transceiver 236, and the other circuitry of the daylight sensor 120.

The controller 230 is operable to control the photosensitive circuit 231 and the RF transceiver 236 in order to conserve battery power. Specifically, the controller 230 is operable to enable the photosensitive circuit 231 (by closing the switch 235 via the photosensitive circuit enable control signal $V_{PS\_ENABLE}$) for a small time period $T_{PD}$ (e.g., 50 msec) during each sampling period $T_{SMPL}$, such that that the photosensitive diode 232 only conducts current for a portion of the time during normal operation (e.g., 5% of the time). In addition, the controller 230 only enables the RF transceiver 236 (via the RF enable control signal $V_{RF\_ENABLE}$) when required. As previously mentioned, the controller 230 only enables the RF transceiver 236 to transmit digital messages when needed, i.e., using the variable transmission rate (as will be described in greater detail below with reference to FIG. 8). The controller 230 only enables the RF transceiver 236 to receive digital messages in response to the laser pointer circuit 244 receiving light from a laser pointer through the laser-pointer receiving opening 156. When the photosensitive circuit 231 and the RF transceiver 236 are disabled, the controller 230 is operable to enter a sleep mode in which the controller consumes less power.

Figure 6B:
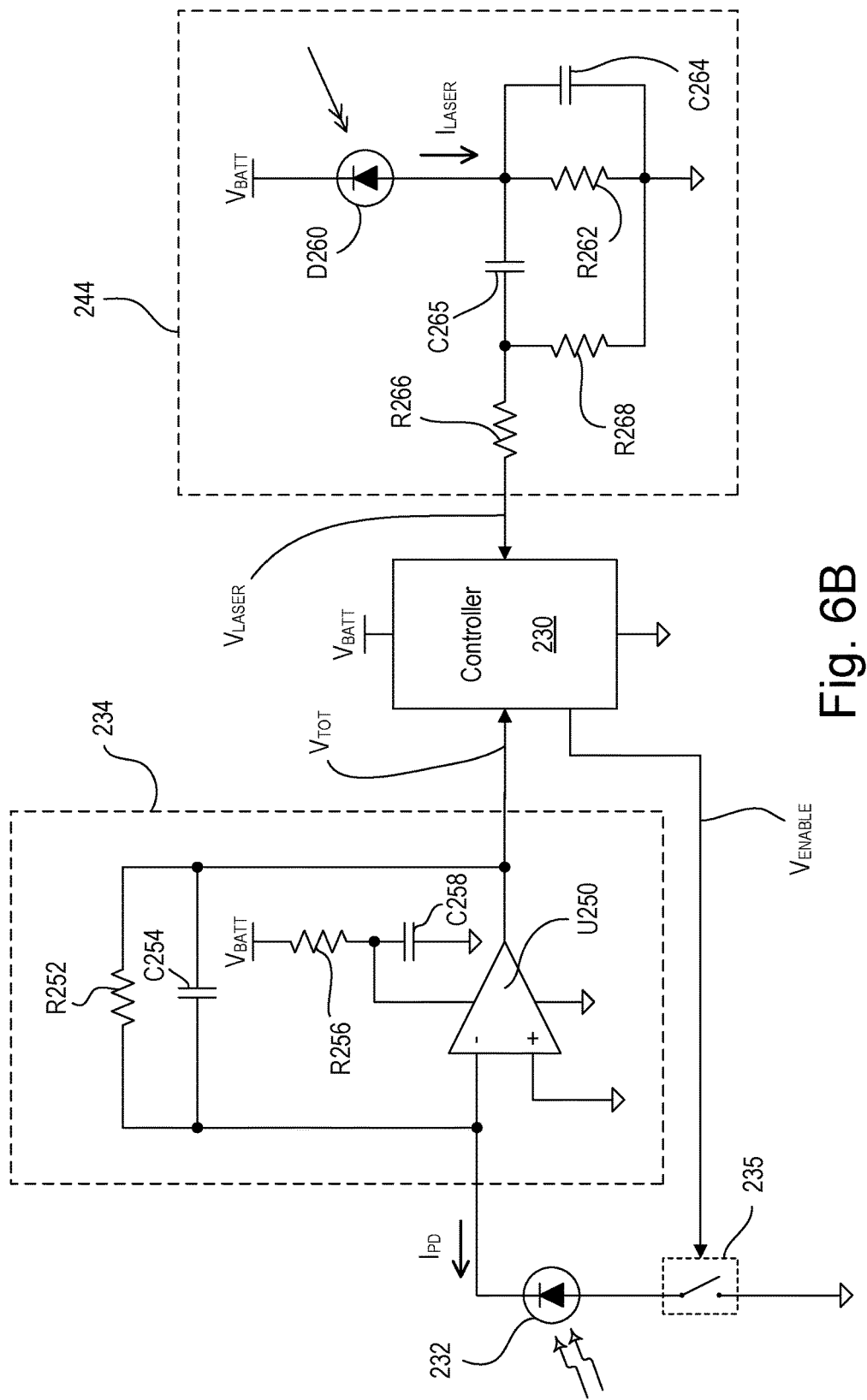
FIG. 6B is a simplified schematic diagram of the daylight sensor of FIG. 6A.

FIG. 6B is a simplified schematic diagram of the daylight sensor 120 showing the transimpedance amplifier 234 and the laser pointer circuit 244 in greater detail. The transimpedance amplifier 234 comprises an operational amplifier ("op-amp") U250 having a non-inverting input terminal coupled to circuit common. A feedback resistor R252 is coupled between an inverting input terminal and an output terminal of the op-amp U250. The output terminal of the op-amp U250 provides to the controller 230 the total light intensity control signal $V_{TOT}$, which has a magnitude that varies in response to the magnitude of the photosensitive diode current $I_{PD}$. The cathode of the photosensitive diode 232 is coupled to the inverting input terminal of the op-amp U250, such that the photosensitive diode current $I_{PD}$ is conducted through the feedback resistor R252. Thus, the magnitude of the total light intensity control signal $V_{TOT}$ is dependent upon the magnitude of the photosensitive diode current $I_{PD}$ and the resistance of the feedback resistor R252. For example, the resistor R252 may have a resistance of approximately 300 kΩ, such that the magnitude of the total light intensity control signal $V_{TOT}$ ranges from approximately zero volts to three volts as the light intensity shining directly on the photosensitive diode 232 ranges from approximately zero lux to 1000 lux.

The transimpedance amplifier 234 further comprises a feedback capacitor C254 (e.g., having a capacitance of approximately 0.022 µf) for providing some low-pass filtering, such that the magnitude of the total light intensity control signal $V_{TOT}$ is not responsive to high-frequency noise in the photosensitive diode current $I_{PD}$. In addition, the op-amp U250 is powered from the battery V1 through a low-pass filter comprising a resistor R256 (e.g., having a resistance of approximately 22Ω and a capacitor C258 (e.g., having a capacitance of approximately 0.1 µF). The low-pass filter prevents high-frequency noise that may be coupled to the battery V1 from the RF transceiver 236 from affecting the operation of the photosensitive circuit 231.

The laser pointer circuit 244 comprises a laser-responsive element, e.g., a light-emitting diode (LED) D260. The LED D260 is positioned inside the daylight sensor 120 such that light from a laser pointer may shine through the laser-pointer receiving opening 156 and onto the LED. The LED D260 may be a green LED, such that a laser current $I_{LASER}$ conducted through the LED increases in magnitude when a green laser pointer is shined onto the LED. A resistor R262 is coupled between the anode of the LED D260 and circuit common and has, for example, a resistance of approximately 1 MΩ. A capacitor C264 is coupled in parallel with the resistor R262 and has, for example, a capacitance of approximately 0.01 µF. The junction of the LED D260 and the resistor R262 is coupled to the controller 230 through a capacitor C265 (e.g., having a capacitance of approximately 0.22 pF) and a resistor R266 (e.g., having a resistance of approximately 10 kΩ). The junction of the capacitor C265 and the resistor R266 is coupled to circuit common through a resistor (e.g., having a resistance of approximately 1 MΩ). When a laser pointer is shined onto the LED D260 and the laser current $I_{LASER}$ increases in magnitude, the voltage across the parallel combination of the resistor R262 and the capacitor C264 also increases in magnitude. Accordingly, the capacitor C265 conducts a pulse of current and the laser pointer control signal $V_{LASER}$ also increases in magnitude. The input of the controller 230 that receives the laser pointer control signal $V_{LASER}$ is an interrupt pin, such that the controller 230 is operable to come out of sleep mode in response to the laser pointer. The controller 230 may then be operable to enable the RF transceiver 236 to receive a digital message as will be described in greater detail below with reference to FIG. 10A.

According to the present invention, the daylight sensor 120 is operable to transmit digital messages to the dimmer switch 110 using the variable transmission rate that is dependent upon the present change in the total light intensity $L_{T\text{-}SNSR}$ as measured by the daylight sensor 120. The daylight sensor 120 is operable to determine the total light intensity $L_{T\text{-}SNSR}$ from the magnitude of the total light intensity control signal $V_{TOT}$, and to only transmit one or more values representative of the total light intensity $L_{T\text{-}SNSR}$ (e.g., in foot-candles) to the dimmer switch 110 when the total light intensity $L_{T\text{-}SNSR}$ has changed by at least a first predetermined percentage $\Delta S_{MAX1}$. Since the total light intensity $L_{T\text{-}SNSR}$ as measured by the daylight sensor 120 changes throughout a typical day, the variable transmission rate also changes throughout the day (as shown in FIG. 3). The variable transmission rate ensures that the daylight sensor 120 only transmits digital messages when needed (i.e., when the total light intensity $L_{T\text{-}SNSR}$ is changing quickly, but not too quickly). Because the controller 230 is able to disable the photosensitive circuit 231 (by opening the switch 235 via the photosensitive circuit enable control signal $V_{PS\_ENABLE}$), the daylight sensor 120 is able to conserve battery power by not transmitting digital messages to the dimmer switch 110 as often when the total light intensity $L_{T\text{-}SNSR}$ is relatively constant with respect to time.

Figure 7:
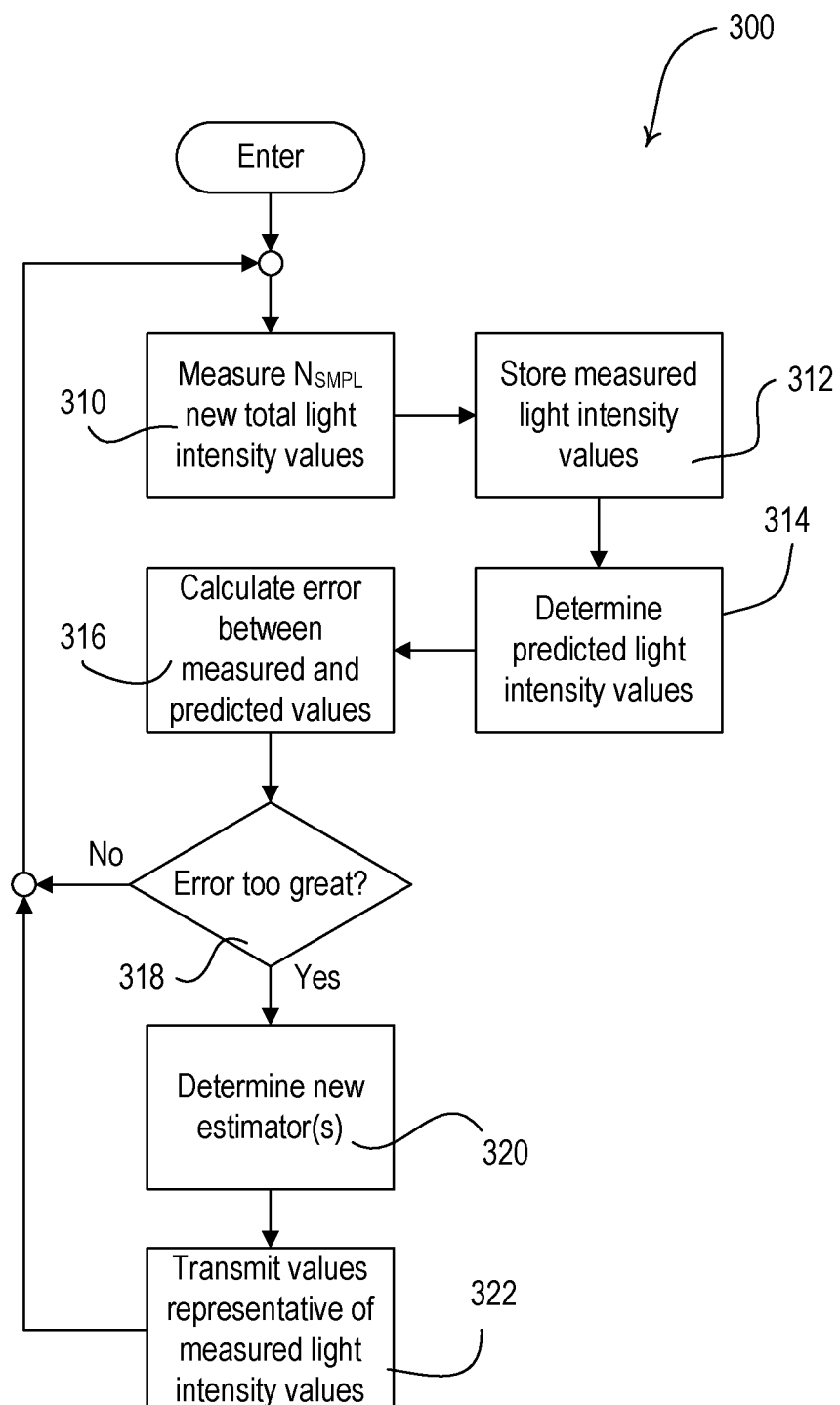
FIG. 7 is a simplified flowchart of a transmission algorithm executed by a controller of the daylight sensor of FIG. 1 according to a first embodiment of the present invention, such that the daylight sensor transmits digital messages using a variable transmission rate.

FIG. 7 is a simplified flowchart of a transmission algorithm 300 executed by the controller 230 of the daylight sensor 120 according to the first embodiment of the present invention, such that the daylight sensor 120 transmits digital messages using the variable transmission rate. The transmission algorithm 300 as shown in FIG. 7 is generalized and specific embodiments are detailed below. According to the first embodiment, the controller 230 collects a predetermined number $N_{SMPL}$ of measurements of the total light intensity $L_{T\text{-}SNSR}$ (e.g., ten) during consecutive non-overlapping time intervals (i.e., windows) that each have a length equal to a predetermined time period $T_{WIN}$ (i.e., $T_{WIN}=N_{SMPL}\cdot T_{SMPL}$). The controller 230 determines one or more estimators from a previous time interval and uses the estimator to estimate one or more predicted light intensity values in the present time interval. At end of the present time interval, the controller 230 determines whether a digital message including one or more values representative of the total light intensity $L_{T\text{-}SNSR}$ should be transmitted to the dimmer switch 110 in response to the error between the measured light intensity values and the predicted light intensity values. The transmission algorithm 300 is executed with at a period equal to the predetermined time period $T_{WIN}$. Accordingly, the minimum time period between transmissions by the daylight sensor 120 according to the first embodiment is equal to the predetermined time period $T_{WIN}$. For example, the predetermined time period $T_{WIN}$ may be approximately ten seconds, but may alternatively range from approximately five seconds to thirty seconds.

Referring to FIG. 7, the controller 230 first measures the predetermined number $N_{SMPL}$ of new total light intensity values at step 310, and stores the measured total light intensity values at step 312. Next, the controller 230 determines the predicted light intensity value(s) at step 314 using the estimator(s) determined during one of the previous time intervals, and calculates an error between the measured total light intensity values and the predicted total light intensity values at step 316. If the error is outside of predetermined limits (i.e., is too great) at step 318, the controller 230 calculates the new estimator(s) for use during the subsequent time interval at step 320 and transmits a digital message including one or more values representative of the total light intensity $L_{T\text{-}SNSR}$ as measured by the daylight sensor 120 to the dimmer switch 110 at step 322. For example, the controller 230 may transmit one or more of the measured total light intensity values to the dimmer switch 110. Alternatively, the controller 230 may transmit the new estimator(s) determined at step 320 to the dimmer switch 110. After transmitting a digital message to the dimmer switch 110, the transmission algorithm 300 loops around, such that the controller 230 may collect the predetermined number $N_{SMPL}$ of measurements of the total light intensity $L_{T\text{-}SNSR}$ during the subsequent non-overlapping time interval. If the error is within the predetermined limits at step 318, the controller 230 does not calculate the new estimator(s) at step 320 and does not transmit the value representative of the total light intensity $L_{T\text{-}SNSR}$ at step 324, but simply analyzes the next non-overlapping time interval.

According to the first embodiment of the present invention, the controller 230 of the daylight sensor 120 uses a single data point as the estimator. For example, the controller 230 may use the minimum value of the measured light intensity values from the previous time interval as the estimator. Alternatively, the controller 230 may use the average or median value of the measured light intensity values from the previous time interval as the estimator. Since the estimator is a single data point, the controller 230 only uses one predicted light intensity value at step 314 of the transmission algorithm 300. For example, the predicted light intensity value may be equal to the estimator. The controller 230 then calculates the error using the minimum value of the measured light intensity values from the present time interval and the predicted light intensity value (i.e., the estimator).

Figure 8:
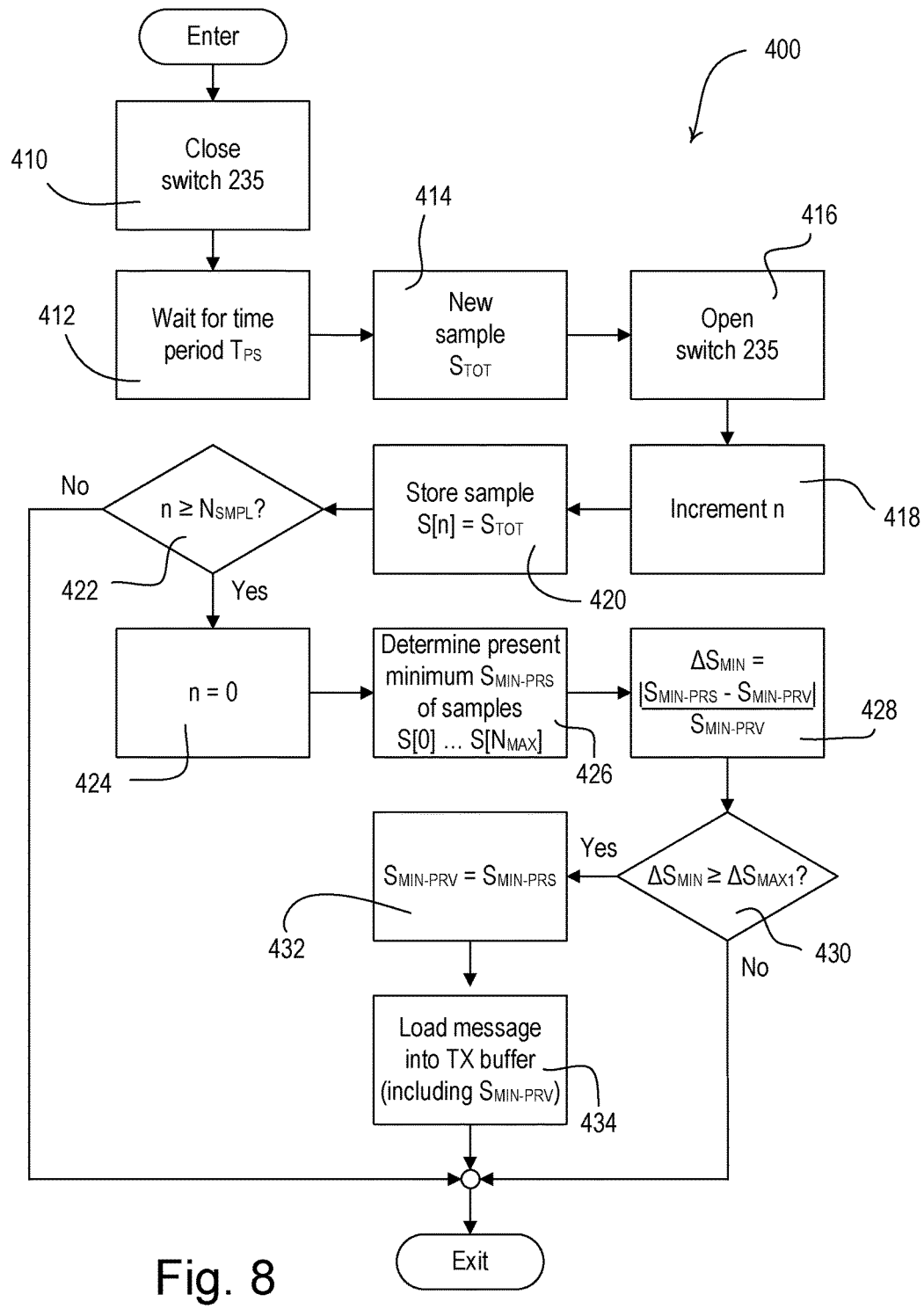
FIG. 8 is a simplified flowchart of a variable transmission control procedure executed by the controller of the daylight sensor of FIG. 1 according to the first embodiment of the present invention.

FIG. 8 is a simplified flowchart of a variable transmission control procedure 400 executed by the controller 230 of the daylight sensor 120 according to the first embodiment of the present invention. The controller 230 executes the variable transmission control procedure 400 periodically (e.g., approximately once every second) during normal operation in order to sample the total light intensity control signal $V_{TOT}$, to thus collect the predetermined number $N_{SMPL}$ of samples (e.g., approximately ten samples) during each of the consecutive non-overlapping time intervals. Specifically, the controller 230 first enables the photosensitive circuit 231 at step 410 by closing the controllable switch 235 using the photosensitive circuit enable control signal $V_{PS\_ENABLE}$. The controller 230 waits for the time period $T_{PD}$ (i.e., 50 msec)

at step 412 to allow the photosensitive diode current $I_{PD}$ to become representative of the total light intensity $L_{T\text{-}SNSR}$ at the daylight sensor 120. The controller 230 samples the total light intensity control signal $V_{TOT}$ to generate a new total light intensity sample $S_{TOT}$ at step 414, and disables the photosensitive circuit 231 by opening the switch 235 using the photosensitive circuit enable control signal $V_{PS\_ENABLE}$ at step 416. The controller 230 then increments a variable n by one at step 418 and stores the new total light intensity sample $S_{TOT}$ as sample S[n] in the memory 246 at step 420. If the variable n is less than the predetermined number $N_{SMPL}$ of samples at step 422, the variable transmission control procedure 400 simply exits without processing the samples S[n] stored in the memory 246. The controller 230 will execute the variable transmission control procedure 400 once again to collect a new sample of the total light intensity control signal $V_{TOT}$.

If the variable n is greater than or equal to the predetermined number $N_{SMPL}$ of samples at step 422, the controller 230 processes the samples S[n] stored in the memory 246 in order to determine if a digital message should be transmitted to the dimmer switch 110. First, the controller 230 resets the variable n to zero at step 424. The controller 230 then determines if the total light intensity $L_{T\text{-}SNSR}$ has changed by at least the first predetermined percentage $\Delta S_{MAX1}$. Specifically, the controller 230 determines a present minimum sample $S_{MIN\text{-}PRS}$ of the samples S[n] stored in the memory 246 (i.e., samples S[0] through S[$N_{SMPL}$]) at step 426. The controller 230 then calculates a minimum sample adjustment percentage $\Delta S_{MIN}$ that is representative of the amount of change of the total light intensity $L_{T\text{-}SNSR}$ at step 428 using the equation:

$$\Delta S_{MIN} = \frac{|S_{MIN-PRS} - S_{MIN-PRV}|}{S_{MIN-PRV}}, \qquad \text{(Equation 1)}$$

where the sample $S_{MIN\text{-}PRV}$ is the previous minimum sample determined during the previous time period $T_{WIN}$ that is stored in the memory 246. If the minimum sample adjustment percentage $\Delta S_{MIN}$ is less than the first predetermined percentage $\Delta S_{MAX1}$ at step 430, the variable transmission control procedure 400 exits without the controller 230 transmitting a digital message to the dimmer switch 110. In other words, the controller 230 has determined that the total light intensity $L_{T\text{-}SNSR}$ has not changed significantly enough to merit a transmission of a digital message. For example, the first predetermined percentage $\Delta S_{MAX1}$ may be approximately 15%, but may alternatively range from approximately 1% to 20%.

If the minimum sample adjustment percentage $\Delta S_{MIN}$ is greater than or equal to the first predetermined percentage $\Delta S_{MAX1}$ at step 430, the controller 230 sets the previous minimum sample $S_{MIN\text{-}PRV}$ equal to the present minimum sample $S_{MIN\text{-}PRS}$ at step 432. The controller 230 then loads a digital message including a value representative of the total light intensity $L_{T\text{-}SNSR}$ as measured by the daylight sensor 120 (e.g., in foot-candles) in a transmit (TX) buffer at step 434, before the variable transmission control procedure 400 exits. For example, the controller 230 may include the minimum present minimum sample $S_{MIN\text{-}PRS}$ in the digital message loaded into the TX buffer. The controller 230 will transmit the digital message to the dimmer switch 110 via the RF signals 106 using a transmit procedure (not shown). An example of a transmit procedure is described in previously-referenced U.S. patent application Ser. No. 12/203,518.

Figure 9:
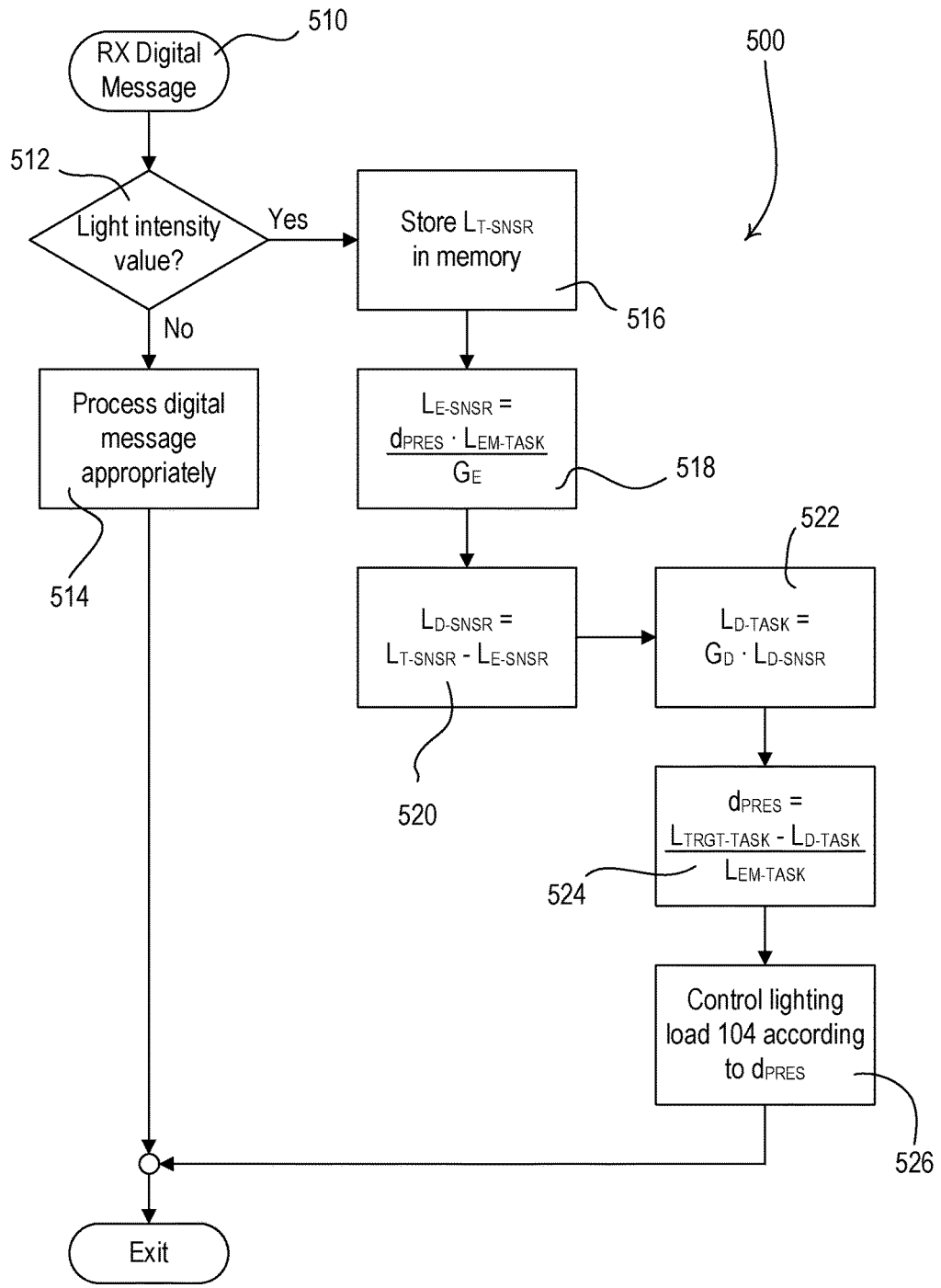
FIG. 9 is a simplified flowchart of a receive procedure executed by a controller of the dimmer switch of FIG. 1 according to the first embodiment of the present invention.

FIG. 9 is a simplified flowchart of a receive procedure 500 executed by the controller 214 of the dimmer switch 110 when a digital message is received from the daylight sensor 120 at step 510. As previously mentioned, the dimmer switch 110 adjusts the present light intensity $L_{PRES}$ of the lighting load 104 so as to control the total light intensity $L_{T\text{-}TASK}$ on the task surface towards the target total task surface light intensity $L_{TRGT\text{-}TASK}$. Specifically, the dimmer switch 110 uses a present dimming percentage $d_{PRES}$ to control the present light intensity $L_{PRES}$ of the lighting load 104. The present dimming percentage $d_{PRES}$ is calculated in response to the received digital messages and a target task surface light intensity value $L_{TRGT\text{-}TASK}$ during the receive procedure 500. For example, the present dimming percentage $d_{PRES}$ may be a number between zero and one. The controller 214 may apply the present dimming percentage $d_{PRES}$ to different dimming curves depending upon the load type of the lighting load 104 (i.e., incandescent, fluorescent, etc.) to determine the actual new present light intensity $L_{PRES}$ of the lighting load.

Referring to FIG. 9, if the received digital message does not include a light intensity value received from the daylight sensor 120 at step 512, the controller 214 processes the digital message appropriately at step 514 and the receive procedure 500 exits. For example, the digital message may comprise a calibration message transmitted during a calibration procedure of the daylight sensor 120. However, if the received digital message includes a light intensity value at step 512, the controller 214 stores the total light intensity $L_{T\text{-}SNSR}$ as measured by the daylight sensor 120 (and as received in the digital message) in the memory 248 at step 516. As noted above, the value representative of the total light intensity $L_{T\text{-}SNSR}$ in the received digital message may be equal to the minimum present minimum sample $S_{MIN\text{-}PRS}$ from the variable transmission control procedure 400 executed by the controller 230 of the daylight sensor 120 (i.e., $L_{T\text{-}SNSR} = S_{MIN\text{-}PRS}$).

At step 518, the controller 214 calculates the light intensity $L_{E\text{-}SNSR}$ measured by the daylight sensor 120 from only the lighting load 104 using the electric light gain $G_E$, i.e., $$L_{E-SNSR} = \frac{d_{PRES} \cdot L_{EM-TASK}}{G_E}, \qquad \text{(Equation 2)}$$

where $L_{EM\text{-}TASK}$ represents the light intensity on the task surface 136 from only the lighting load 104 when the lighting load is at the maximum light intensity. For example, the controller 214 may set the light intensity $L_{EM\text{-}TASK}$ from Equation 2 equal to the light intensity $L_{E\text{-}TASK}$ on the task surface from only the lighting load 104 (from the gain calibration procedure), or to a predetermined value, such as, fifty foot-candles. At step 520, the controller 214 calculates the light intensity $L_{D\text{-}SNSR}$ at the daylight sensor 120 from only natural light by subtracting the light intensity $L_{E\text{-}SNSR}$ at the daylight sensor from only the lighting load 104 (as calculated at step 518) from the total light intensity $L_{T\text{-}SNSR}$ measured by the daylight sensor (as received in the digital message), i.e., $$L_{D-SNSR} = L_{T-SNSR} - L_{E-SNSR}. \qquad \text{(Equation 3)}$$

At step 522, the controller 214 calculates the light intensity $L_{D\text{-}TASK}$ on the task surface from only daylight by multiplying the light intensity $L_{D-SNSR}$ at the daylight sensor 120 from only daylight by the daylight gain $G_D$, i.e., $$L_{D-TASK} = G_D \cdot L_{D-SNSR}. \quad \text{(Equation 4)}$$

At step 524, the controller 214 calculates the new present dimming percentage $d_{PRES}$ as a function of the target total task surface light intensity $L_{TRGT-TASK}$, the light intensity $L_{D-TASK}$ on the task surface from only daylight, and the light intensity $L_{EM-TASK}$ on the task surface 136 from only the lighting load 104 when the lighting load is at the maximum light intensity, i.e., $$d_{PRES} = \frac{L_{TRGT-TASK} - L_{D-TASK}}{L_{EM-TASK}}. \quad \text{(Equation 5)}$$

Finally, the controller 214 controls the lighting load 104 according to the new present dimming percentage $d_{PRES}$, before the receive procedure 500 exits.

Figure 10A:
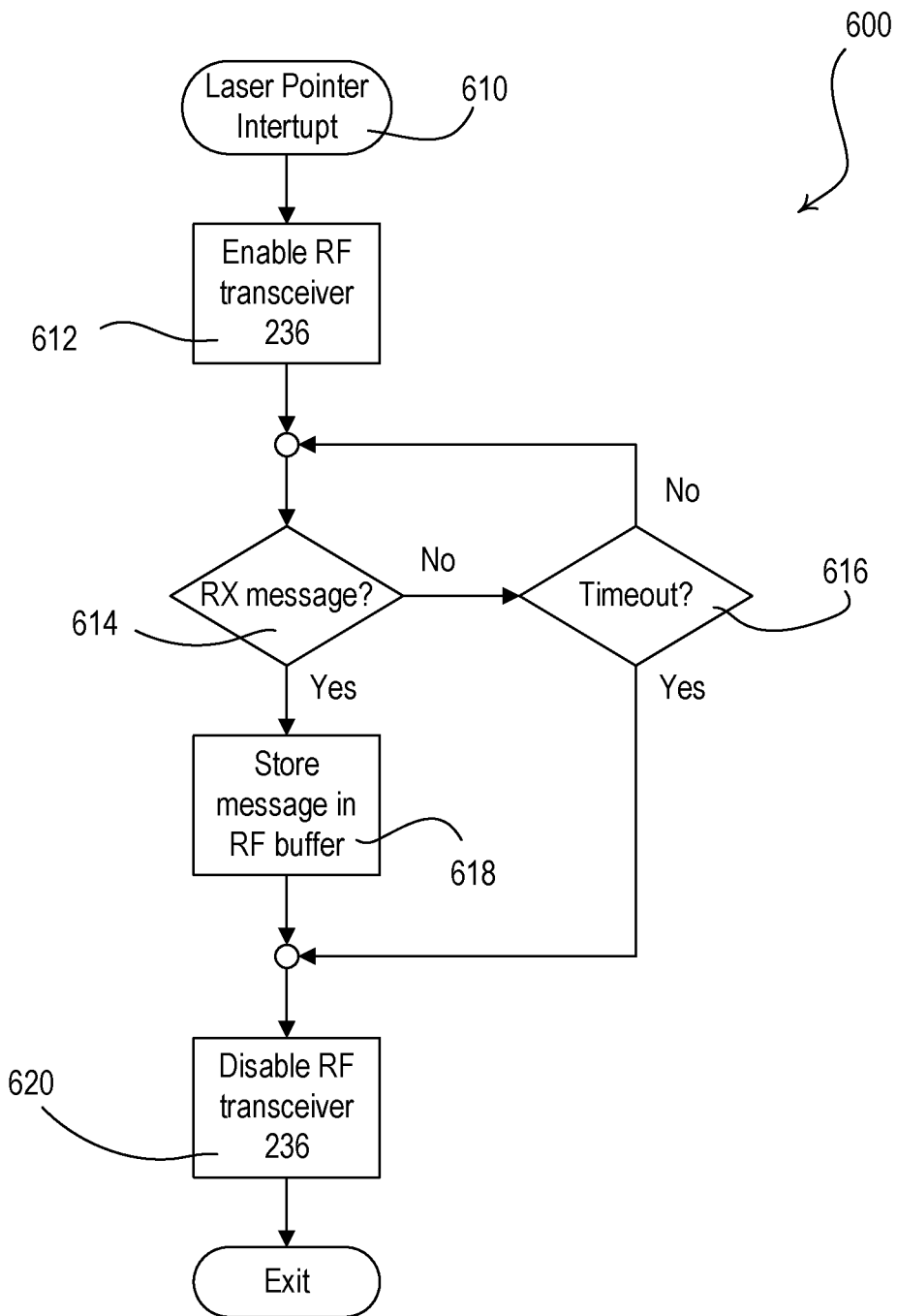
FIG. 10A is a simplified flowchart of a laser pointer interrupt procedure executed by the controller of the daylight sensor of FIG. 1.

FIG. 10A is a simplified flowchart of a laser pointer interrupt procedure 600 executed by the controller 230 in response to the laser pointer circuit 244 detecting light from a laser pointer when the controller is in the sleep mode. Specifically, when the laser pointer control signal $V_{LASER}$ is pulled high towards the battery voltage $V_{BATT}$ at step 610, the controller 230 first enables the RF transceiver 236 via the RF enable control signal $V_{RF\_ENABLE}$ at step 612. The controller 230 then waits until a digital message is received at step 614 or a timeout expires at step 616. If a digital message is received at step 614 (e.g., from the dimmer switch 110), the controller 230 stores the received digital message in a receive (RX) buffer at step 618, such that the controller 230 may process the received digital message at a later time. The controller 230 then disables the RF transceiver 236 via the RF enable control signal $V_{RF\_ENABLE}$ at step 620, and the laser pointer interrupt procedure 600 exits. If the timeout expires at step 616 before a digital message is received at step 614, the controller 230 simply disables the RF transceiver 236 at step 620, before the laser pointer interrupt procedure 600 exits.

Figure 10B:
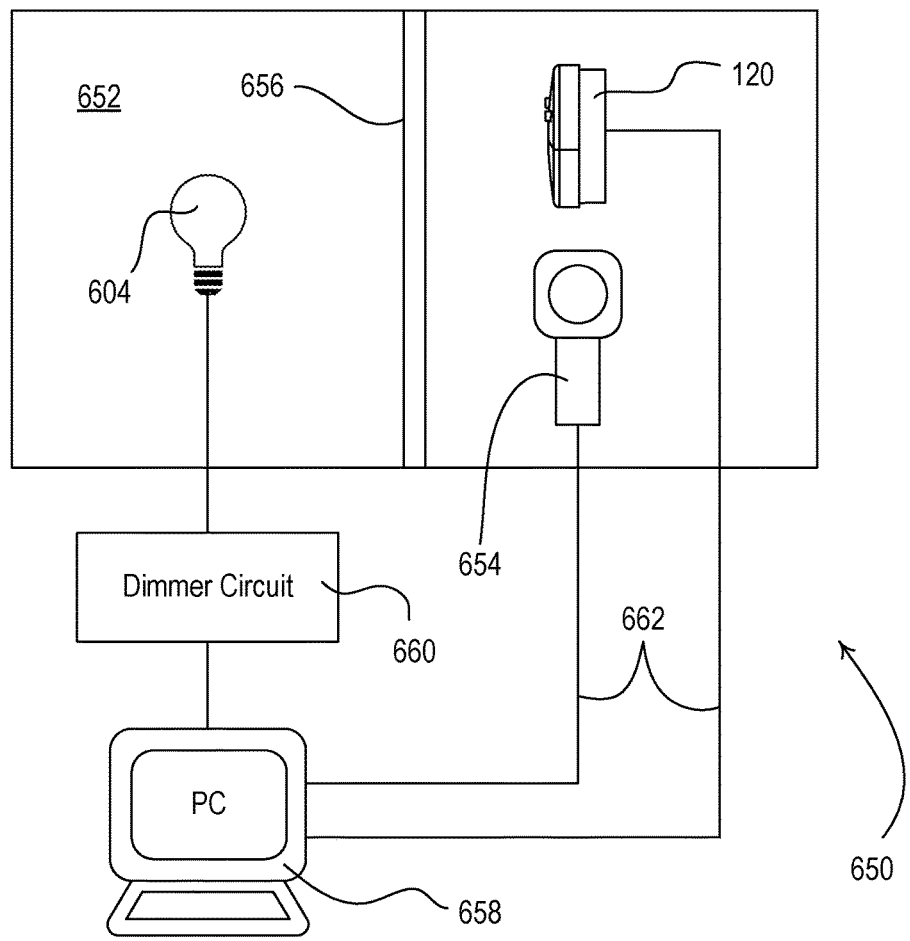
FIG. 10B is a diagram of an example test setup for the daylight sensor of FIG. 1 according to the first embodiment of the present invention.
Figure 10C:
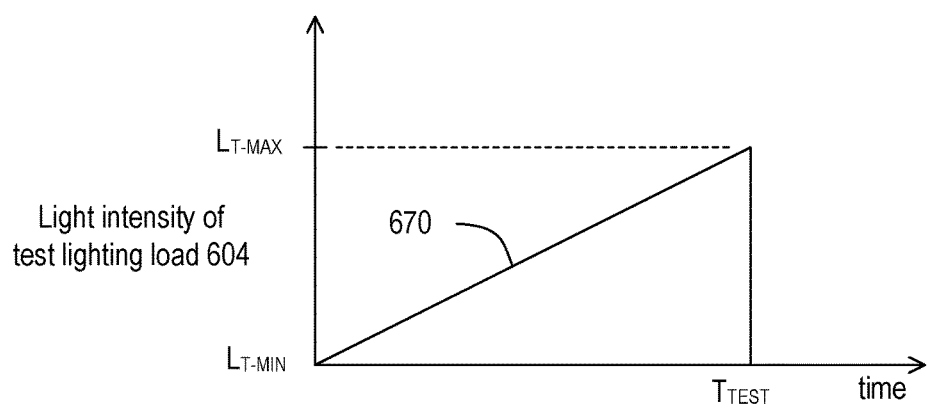
FIG. 10C is a plot of an example test waveform for the daylight sensor of FIG. 1 according to the first embodiment to be used in the test setup shown in FIG. 10B.

FIG. 10B is a diagram of an example test setup 650 and FIG. 10C is a plot of an example test waveform 670 for the daylight sensor 120 of the first embodiment. The test setup 650 comprises test box 652 having a first compartment in which a test lighting load 604 is located and a second compartment in which the daylight sensor 120 and a light meter 654 are located. The first and second compartments of the test box 652 are separated by a light diffuser 656. The test setup 650 further comprises a personal computer (PC) 658, which coupled to the daylight sensor 120 and the light meter 654 via serial connections 662. The PC is operable to adjust the intensity of the lighting load 604 using a dimmer circuit 660 according to the test waveform 670 and to observe the transmission rate of the daylight sensor 120 as well as the actual light intensity as measured by the light meter 654. The test waveform 670 controls the intensity of the test lighting load 604 linearly from a minimum test intensity $L_{T-MIN}$ to a maximum test intensity $L_{T-MAX}$ and has a length $T_{TEST}$, such that the test waveform 670 has a slope $m_{TEST}$, i.e., $m_{TEST} = (L_{T-MAX} - L_{T-MIN})/T_{TEST}$. If the test waveform 670 has a first slope, the rate of transmission of the daylight sensor 120 of the first embodiment will remain constant at a first rate. For example, the minimum test intensity $L_{T-MIN}$ may be zero foot-candles, the maximum test intensity $L_{T-MAX}$ may be 50 foot-candles, and the length $T_{TEST}$ may be two hours. If the test waveform 670 is altered to have a second slope less than the first slope (e.g., if the length $T_{TEST}$ is increased to approximately three hours), the rate of transmission of the daylight sensor 120 will change to a second rate less than the first rate.

According to a second embodiment of the present invention, the controller 230 uses a linear least-squares prediction model to determine the predicted light intensity values. Specifically, the controller 230 is operable to perform a linear least-squares fit on the measured light intensity values from a present time interval to determine a slope m and an offset b of a line (i.e., y=mx+b) that best represents the change in the measured light intensity values with respect to time. The controller 230 uses these estimators (i.e., the slope m and the offset b) to determine the predicted light intensity values for one or more of the subsequent time intervals. The controller 230 then determines a mean-square error e between the measured light intensity values and the predicted light intensity values.

Figure 11:
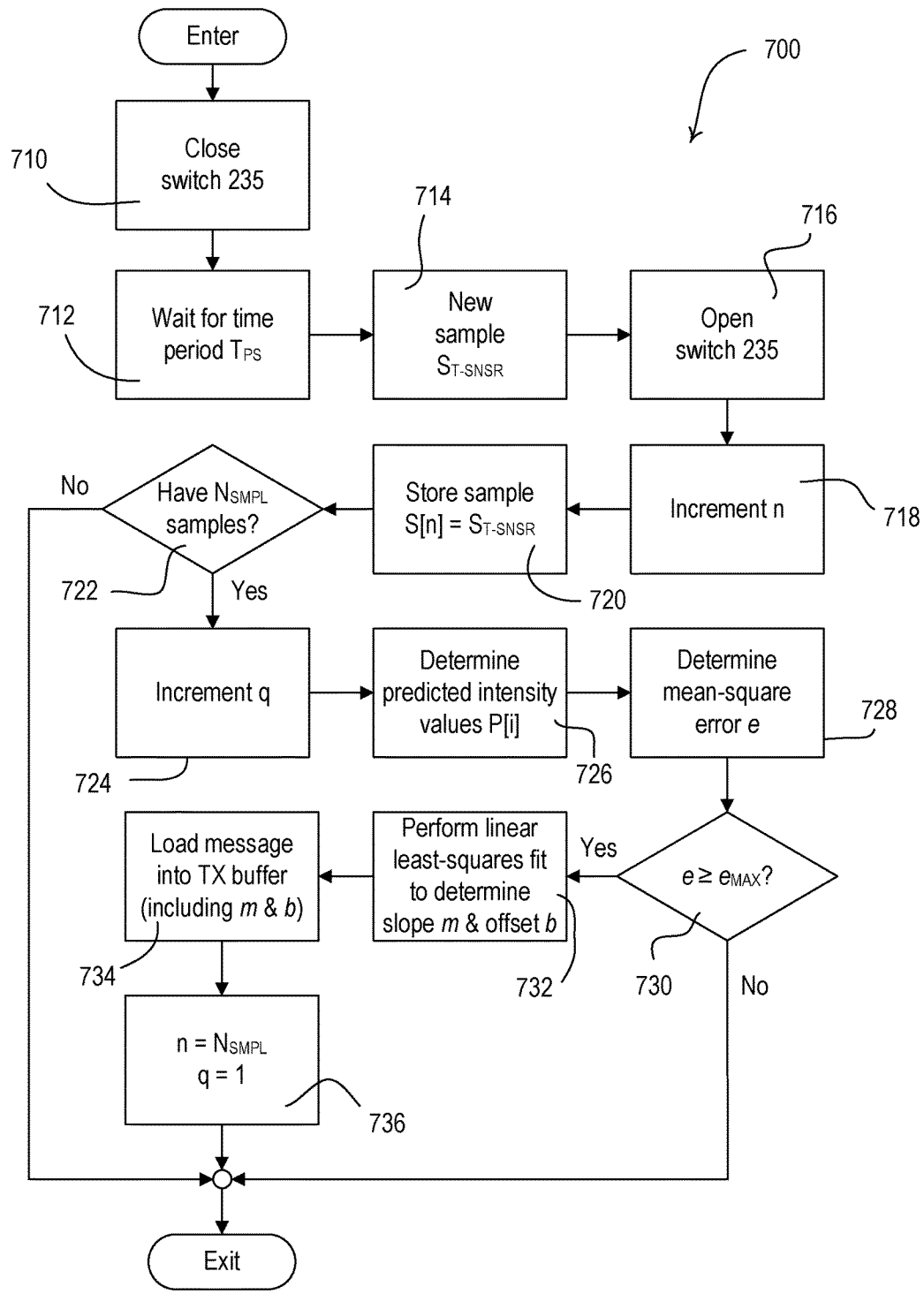
FIG. 11 is a simplified flowchart of a variable transmission control procedure executed by the controller of the daylight sensor of FIG. 1 according to a second embodiment of the present invention.

FIG. 11 is a simplified flowchart of a variable transmission control procedure 700 executed by the controller 230 of the daylight sensor 120 according to the second embodiment of the present invention. As in the first embodiment, the controller 230 executes the variable transmission control procedure 700 of the second embodiment periodically (e.g., approximately once every second) during normal operation to sample the total light intensity control signal $V_{TOT}$ and to collect the predetermined number $N_{SMPL}$ of samples during each of the consecutive non-overlapping time intervals. The controller 230 closes the controllable switch 235 to enable the photosensitive circuit 231 at step 710, and waits for the time period $T_{PD}$ (i.e., 50 msec) at step 712 to allow the photosensitive diode current $I_{PD}$ to become representative of the total light intensity $L_{T-SNSR}$. The controller 230 then samples the total light intensity control signal $V_{TOT}$ (to generate a new total light intensity sample $S_{TOT}$) at step 714, and opens the controllable switch 235 to disable the photosensitive circuit 231 at step 716. The controller 230 increments a variable n by one at step 718 and stores the new total light intensity sample ST-SNSR as sample S[n] in the memory 246 at step 720. If the controller 230 has not yet collected the predetermined number $N_{SMPL}$ of samples during the present time interval at step 722, the variable transmission control procedure 700 simply exits without processing the samples S[n] stored in the memory 246.

When the controller 230 has collected the predetermined number $N_{SMPL}$ of samples during the present time interval at step 722, the controller 230 processes the samples S[n] stored in the memory 246 to determine if a digital message should be transmitted to the dimmer switch 110. The controller 230 first increments a variable q at step 724. The controller 230 uses the variable q to keep track of how many time intervals have occurred after the time interval in which the estimators were last calculated. The controller 230 then calculates the predicted light intensity values at step 726 using the estimators (i.e., the slope m and the offset b) from a previous time interval, i.e., $$P[i] = m \cdot i + b,$$

for $i = q \cdot T_{WIN} + 1$ to $2q \cdot T_{WIN}$. (Equation 6)

At step 728, the controller 230 determines the mean-square error e between the measured light intensity values and the predicted light intensity values, i.e., $$e = (1/N_{MAX}) \cdot \Sigma (S[i] - P[i])^2,$$

for $i = q^* T_{WIN} + 1$ to $2q^* T_{WIN}$. (Equation 7)

If the mean-square error e is less than a predetermined maximum error $e_{MAX}$ (e.g., approximately 15%) at step 730, the variable transmission control procedure 700 exits without transmitting a digital message to the dimmer switch 110.

However, if the mean-square error e is greater than or equal to the predetermined maximum error $e_{MAX}$ at step 730, the controller 230 then determines the new estimators at step 732 by performing a linear least-squares fit on the measured light intensities from the present time interval to thus determine the slope m and the offset b of the line that best represents the measured light intensities from the present time interval. The controller 230 loads a digital message including one or more values representative of the total light intensity $L_{T-SNSR}$ in the TX buffer at step 734. For example, the controller 230 may include the estimators (i.e., the slope m and the offset b) determined at step 732 in the digital message. Since the slope m and the offset b determined at step 732 represent the measured intensity values from the present time interval, the predicted intensity values determined in the next subsequent time interval will begin at time $T_{WIN}$, which is equal to the predetermined number $N_{SMPL}$ of samples per interval. Therefore, the controller 230 resets the variable n to $N_{SMPL}$ and the variable q to one at step 736, before the variable transmission control procedure 700 exits.

Figure 12:
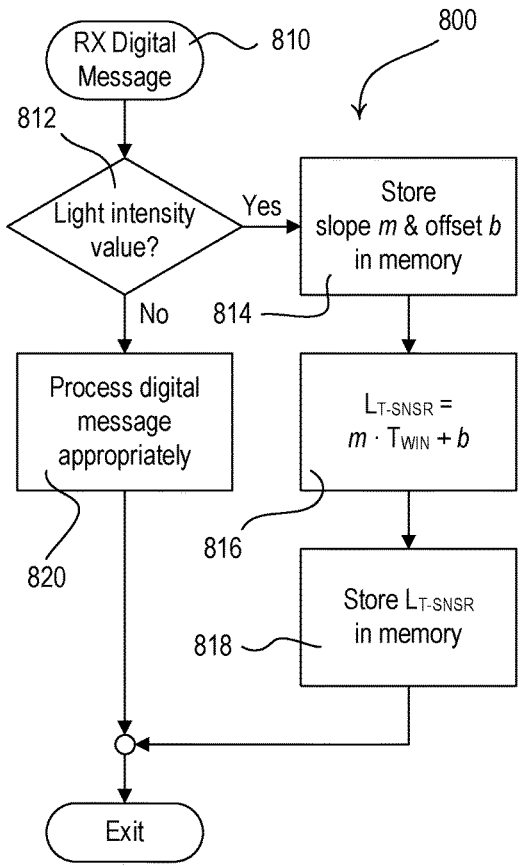
FIG. 12 is a simplified flowchart of a receive procedure executed by the controller of the dimmer switch of FIG. 1 according to the second embodiment of the present invention.

Since both the slope m and the offset b as determined by the daylight sensor 120 are transmitted to the dimmer switch 110, the dimmer switch is operable to continuously re-calculate (i.e., estimate) the total light intensity $L_{T-SNSR}$ as a function of time, and to adjust the present light intensity $L_{PRES}$ of the lighting load 104 in response to the estimated total light intensity $L_{T-SNSR}$. FIG. 12 is a simplified flowchart of a receive procedure 800 executed by the controller 214 of the dimmer switch 110 when a digital message is received from the daylight sensor 120 at step 810 according to the second embodiment of the present invention. If the received digital message includes light intensity values received from the daylight sensor 120 at step 812, the controller 214 stores the slope m and the offset b from the received digital message in the memory 216 at step 814. The controller 214 calculates the total light intensity $L_{T-SNSR}$ as measured the daylight sensor 120 at step 816 using the slope m and the offset b from the received digital message, as well as the predetermined period $T_{WIN}$ of each interval, i.e., $$L_{T-SNSR} = m \cdot T_{WIN} + b. \quad \text{(Equation 8)}$$

The controller 214 then stores the calculated total light intensity $L_{T-SNSR}$ in the memory 216 at step 818, before the receive procedure 800 exits. If the received digital message does not include light intensity values received from the daylight sensor 120 at step 812, the controller 214 processes the digital message appropriately at step 820 and the receive procedure 800 exits.

Figure 13:
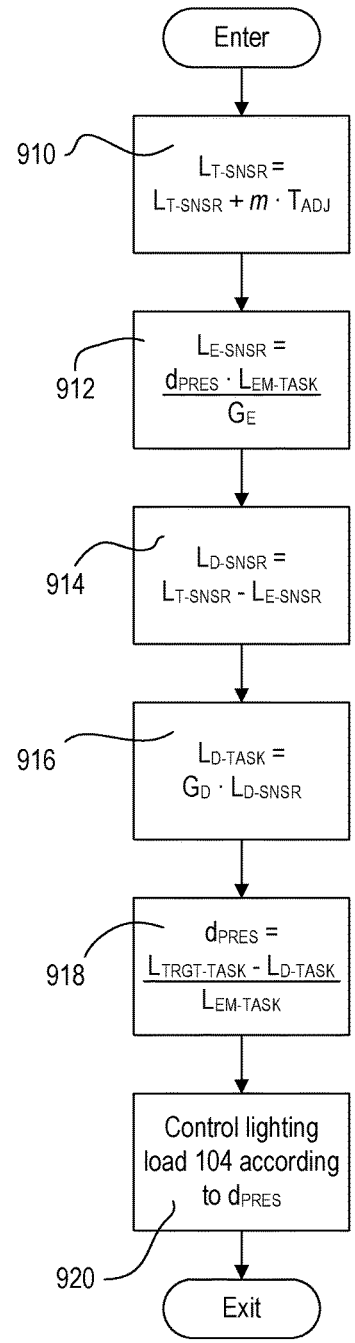
FIG. 13 is a simplified flowchart of a load control procedure executed periodically by the controller of the dimmer switch of FIG. 1 according to the second embodiment of the present invention.

FIG. 13 is a simplified flowchart of a load control procedure 900 executed by the controller 214 of the dimmer switch 110 periodically according to an adjustment period $T_{ADJ}$ (e.g., one second), such that the load control procedure 900 is executed once per second. The controller 214 first updates the total light intensity $L_{T-SNSR}$ (with respect to time) at step 910 using the slope m stored in the memory 216, i.e., $$L_{T-SNSR} = L_{T-SNSR} + m \cdot T_{ADJ}. \quad \text{(Equation 9)}$$

The controller 214 then determines the new present dimming percentage $d_{PRES}$ for the lighting load 104 in a similar manner as in the receive procedure 500 of the first embodiment. Specifically, the controller 214 calculates the light intensity $L_{E-SNSR}$ measured by the daylight sensor 120 from only the lighting load 104 at step 912, calculates the light intensity $L_{D-SNSR}$ at the daylight sensor 120 from only natural light at step 914, calculates the light intensity $L_{D-TASK}$ on the task surface from only daylight at step 916, and calculates the new present dimming percentage $d_{PRES}$ at step 918. The controller 214 then finally controls the lighting load 104 according to the new present dimming percentage $d_{PRES}$ at step 920, before the load control procedure 900 exits.

According to a third embodiment of the present invention, the controller 230 uses a parabolic model to determine the predicted light intensity values. In other words, the controller 230 is operable to perform a parabolic least-squares fit on the measured light intensity values from a present time interval to fit measured light intensity values to a parabola (i.e., $y = ax^2 + bx + c$) that best represents the change in the measured light intensity values with respect to time. The controller 230 uses these estimators (i.e., the coefficients a, b, c of the parabola) to determine the predicted light intensity values for one or more of the subsequent time intervals. The controller 230 then determines a mean-square error e between the measured light intensity values and the predicted light intensity values.

Figure 14:
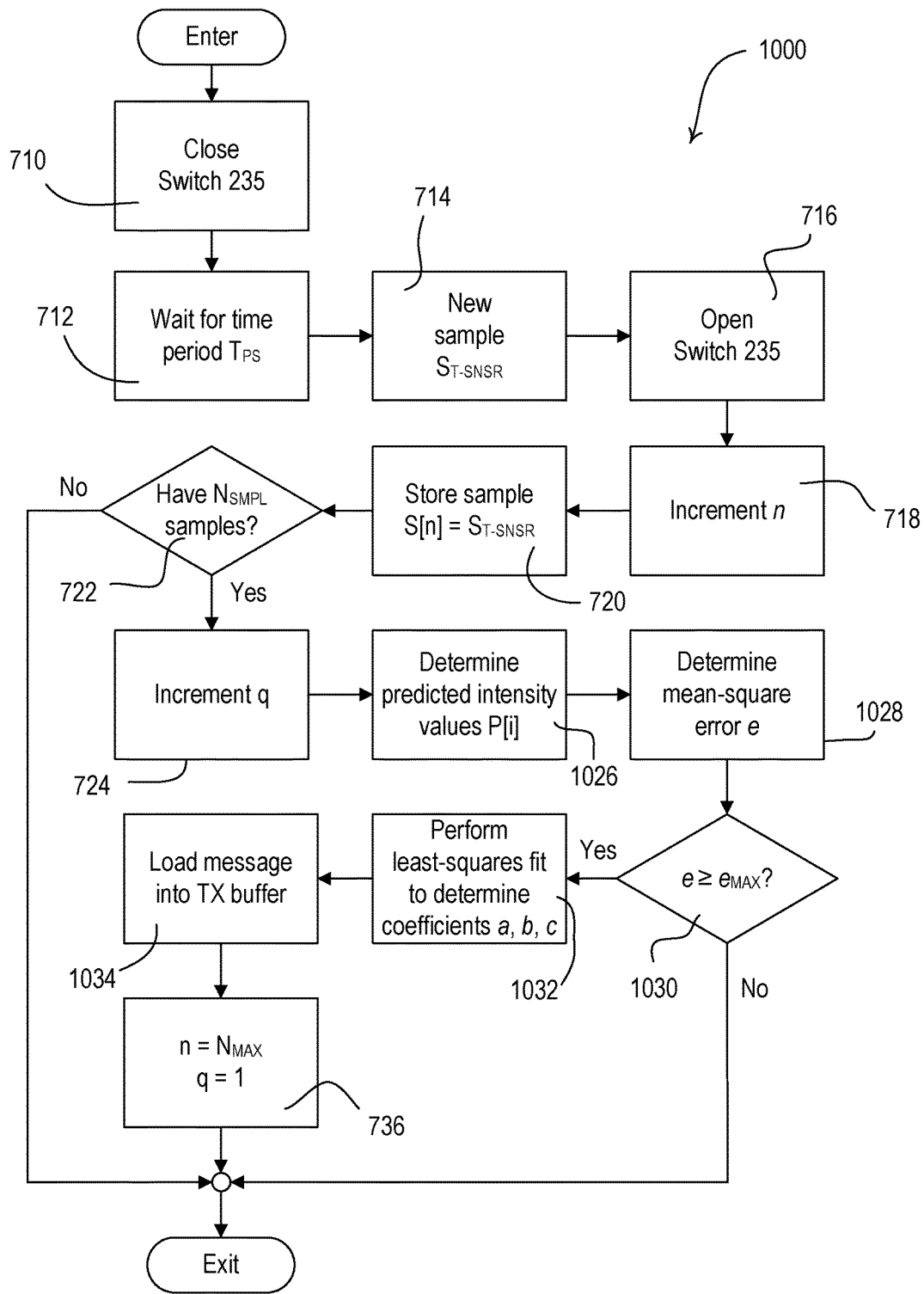
FIG. 14 is a simplified flowchart of a variable transmission control procedure executed by the controller of the daylight sensor of FIG. 1 according to a third embodiment of the present invention.

FIG. 14 is a simplified flowchart of a variable transmission control procedure 1000 executed by the controller 230 of the daylight sensor 120 periodically (e.g., approximately once every second) according to the third embodiment of the present invention. The variable transmission control procedure 1000 is very similar to the variable transmission control procedure 700 of the second embodiment. However, the controller 230 calculates the predicted light intensity values at step 1026 using the coefficients a, b, c (i.e., the estimators) and the parabola equation, i.e., $$P[i] = ai^2 + bi + c,$$

for $i = q \cdot T_{WIN} + 1$ to $2q \cdot T_{WIN}$. \quad (Equation 10)

At step 1028, the controller 230 determines the mean-square error e between the measured light intensity values and the predicted light intensity values. If the mean-square error e is greater than or equal to the predetermined maximum error $e_{MAX}$ at step 1030, the controller 230 determines the new estimators at step 1032 by performing a parabolic least-squares fit on the measured light intensities from the present time interval to thus determine the coefficients a, b, c of the parabola that best represent the measured light intensities from the present time interval. The controller 230 then loads a digital message including one or more values representative of the total light intensity $L_{T-SNSR}$ in the TX buffer at step 1034, e.g., the estimators (i.e., the coefficients a, b, c of the parabola) determined at step 1032. Accordingly, the dimmer switch 110 will execute a receive procedure (not shown) similar to the receive procedure 800 of the second embodiment in order to calculate the total light intensity $L_{T-SNSR}$ as measured by the daylight sensor 120 using the coefficients a, b, c. In addition, the dimmer switch 110 will periodically adjust the present light intensity $L_{PRES}$ of the lighting load 104 using a load control procedure (not shown) similar to the load control procedure 900 of the second embodiment.

According to another alternative embodiment of the present invention, the controller 230 of the daylight sensor 120 could use a linear predictor to determine the predicted light intensity values. For example, the predicted light intensity values may be calculated using the equation:

$$P[i] = -\Sigma(\alpha_i \cdot x[n-i])$$

for $i = 1$ to $K$, \quad (Equation 11)

where x[n−i] are the previous measured light intensity values, $\alpha_i$ are the predictor coefficients, and K is the maximum number of values used to calculate the predicted light intensity.

According to a fourth embodiment of the present invention, the daylight sensor 120 does not transmit digital messages in response to the measured total light intensity $L_{T\text{-}SNSR}$ if the measured data is "misbehaving" so as to reduce the transmission rate and further conserve battery life. For example, the daylight sensor 120 may ignore fluctuations in the measured total light intensity $L_{T\text{-}SNSR}$ that are large in magnitude and short in time duration (i.e., during intermittent-cloudy days as shown in FIG. 3), such that the variable transmission rate of the daylight sensor is also dependent upon the rate of change of the total light intensity $L_{T\text{-}SNSR}$ measured by the daylight sensor (i.e., the "dynamic" change in the total light intensity). Specifically, the daylight sensor 120 does not transmit digital messages to the dimmer switch 110 if the total light intensity $L_{T\text{-}SNSR}$ has changed by more than a second predetermined percentage $\Delta S_{MAX2}$ during the predetermined time period $T_{WIN}$. Accordingly, the variable transmission rate of the daylight sensor 120 of the fourth embodiment of the present invention results in the average time between transmissions by the daylight sensor during the course of a day being greater than approximately 420 seconds (as determined by experimental study).

Figure 15:
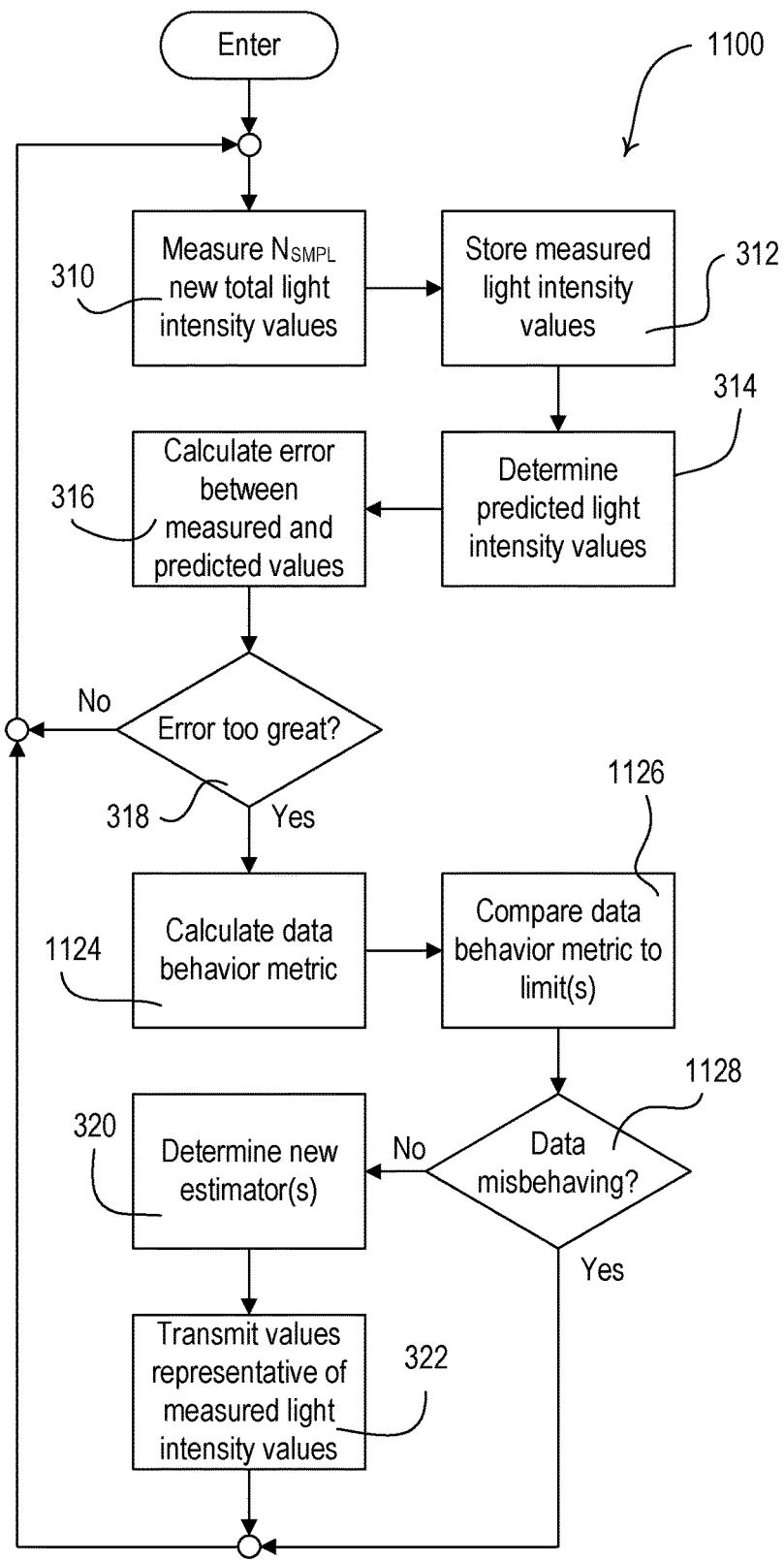
FIG. 15 is a simplified flowchart of a transmission algorithm executed by the controller of the daylight sensor of FIG. 1 according to a fourth embodiment of the present invention.

FIG. 15 is a simplified flowchart of a transmission algorithm 1100 executed by the controller 230 of the daylight sensor 120 according to the fourth embodiment of the present invention, such that the daylight sensor 120 transmits digital messages using the variable transmission rate. The transmission algorithm 1100 of the fourth embodiment is similar to the transmission algorithm 300 of the first, second, and third embodiments (as shown in FIG. 7). The controller 230 first measures and stores the predetermined number $N_{SMPL}$ of new total light intensity values at steps 310 and 312. Next, the controller 230 determines the predicted light intensity value(s) at step 314 using, for example, any of the estimators described with reference to the first through third embodiments, and calculates the error between the measured total light intensity values and the predicted total light intensity values at step 316.

However, according to the fourth embodiment, the controller 230 further analyzes the measured total light intensity values if the error calculated at step 316 is outside of the predetermined limits (i.e., is too great) at step 318. Specifically, the controller 230 using the measured total light intensity values to calculate a data behavior metric at step 1124, compares the calculated data behavior metric to predetermined data behavior metric limit(s) at step 1126, and determines if the data is misbehaving at step 1128, i.e., is outside of the data behavior metric limit(s). For example, the controller 230 may analyze the total light intensity values to determine if the rate of change of the total light intensity $L_{T\text{-}SNSR}$ measured by the daylight sensor 120 is too great. If the data is not misbehaving at step 1128, the controller 230 calculates the new estimator(s) for use during the subsequent time interval at step 320 and transmits a digital message including one or more values representative of the total light intensity $L_{T\text{-}SNSR}$ as measured by the daylight sensor 120 to the dimmer switch 110 at step 322, before the transmission algorithm 1100 loops around. If the data is misbehaving at step 1128, the controller 230 does not calculate the new estimator(s) at step 320 and does not transmit the values representative of the total light intensity $L_{T\text{-}SNSR}$ at step 324, but simply analyzes the next non-overlapping time interval.

Figure 16A:
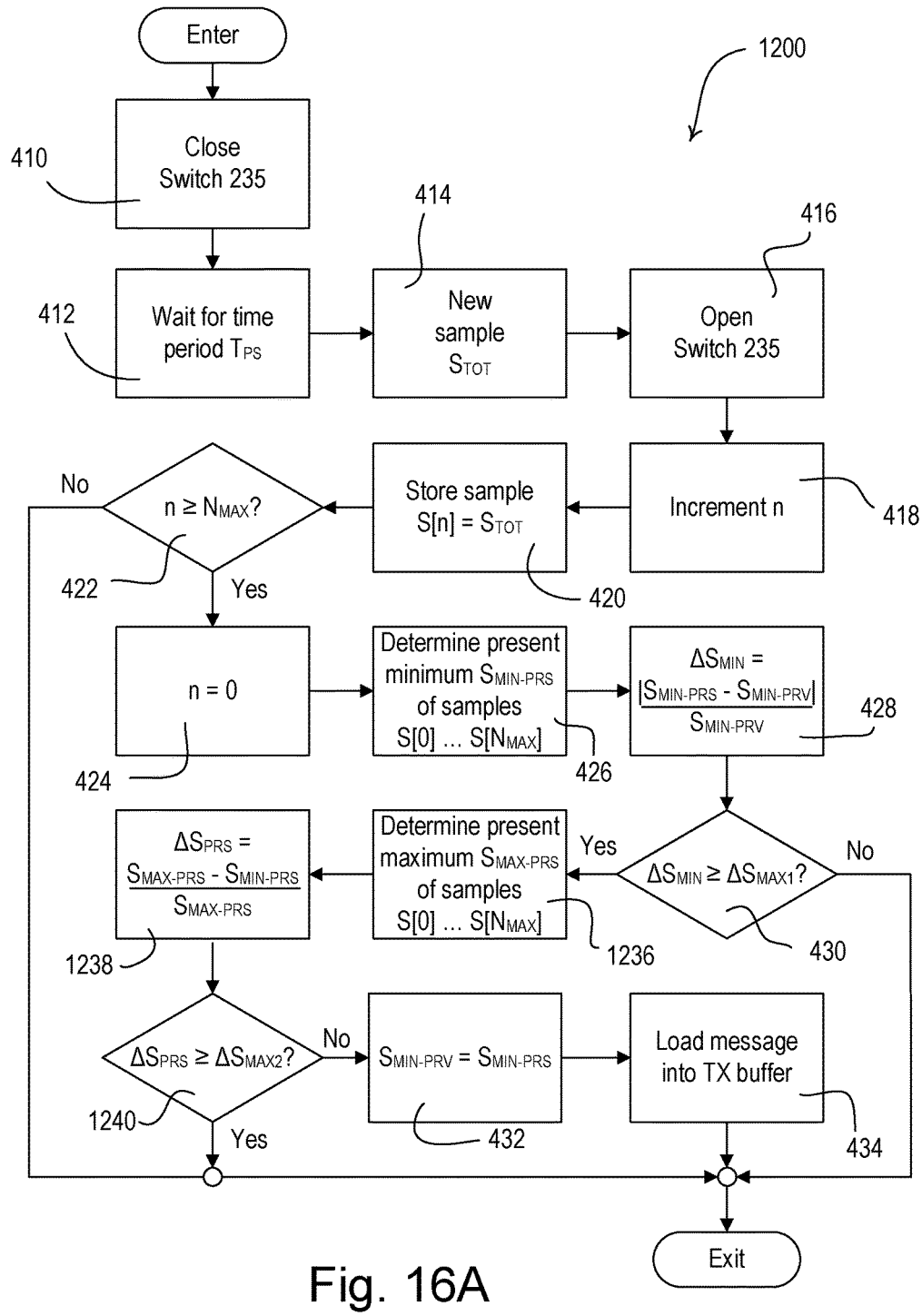
FIG. 16A is a simplified flowchart of a variable transmission control procedure executed by the controller of the daylight sensor of FIG. 1 according to the fourth embodiment of the present invention.

FIG. 16A is a simplified flowchart of a variable transmission control procedure 1200 executed by the controller 230 of the daylight sensor 120 periodically (e.g., approximately once every second) according to the fourth embodiment of the present invention. The variable transmission control procedure 1200 of the fourth embodiment is very similar to the variable transmission control procedure 400 of the first embodiment (as shown in FIG. 8). According to the fourth embodiment of the present invention, the controller 230 uses a single data point as the estimator (as in the first embodiment). However, the controller 230 could alternatively use a linear prediction model or a parabolic prediction model to determine the estimators as described above with reference to the second and third embodiments respectively.

Referring to FIG. 16A, if the minimum sample adjustment percentage $\Delta S_{MIN}$ is greater than or equal to the first predetermined percentage $\Delta S_{MAX1}$ at step 430, the controller 230 determines if the data (i.e., the samples S[n] stored in the memory 246) is misbehaving by determining if the total light intensity $L_{T\text{-}SNSR}$ has changed by more than the second predetermined percentage $\Delta S_{MAX2}$ during the present time period $T_{WIN}$. Specifically, the controller 230 determines a present maximum sample $S_{MAX\text{-}PRS}$ of the samples S[n] stored in the memory 246 (i.e., samples S[0] through $S[N_{SMPL}]$) at step 1236. The controller 230 then calculates a present sample adjustment amount $\Delta S_{PRS}$, which is representative of the rate of change of the total light intensity $L_{T\text{-}SNSR}$, at step 1238 using the equation:

$$\Delta S_{PRS} = \frac{S_{MAX-PRS} - S_{MIN-PRS}}{S_{MAX-PRS}}. \quad \text{(Equation 12)}$$

If the present sample adjustment amount $\Delta S_{PRS}$ is greater than or equal to the second predetermined percentage $\Delta S_{MAX2}$ at step 1240, the variable transmission control procedure 1200 exits without transmitting a digital message to the dimmer switch 110. For example, the second predetermined percentage $\Delta S_{MAX2}$ may be approximately 10%, but may alternatively range from approximately 5% to 25%.

However, if the present sample adjustment amount $\Delta S_{PRS}$ is less than the second predetermined percentage $\Delta S_{MAX2}$ at step 1240, the controller 230 sets the previous minimum sample $S_{MIN\text{-}PRV}$ equal to the present minimum sample $S_{MIN\text{-}PRS}$ at step 432. The controller 230 then loads a digital message including a value representative of the total light intensity $L_{T\text{-}SNSR}$ as measured by the daylight sensor 120 (i.e., the minimum present minimum sample $S_{MIN\text{-}PRS}$) in a transmit (TX) buffer at step 434, before the variable transmission control procedure 1200 exits.

Figure 16B:
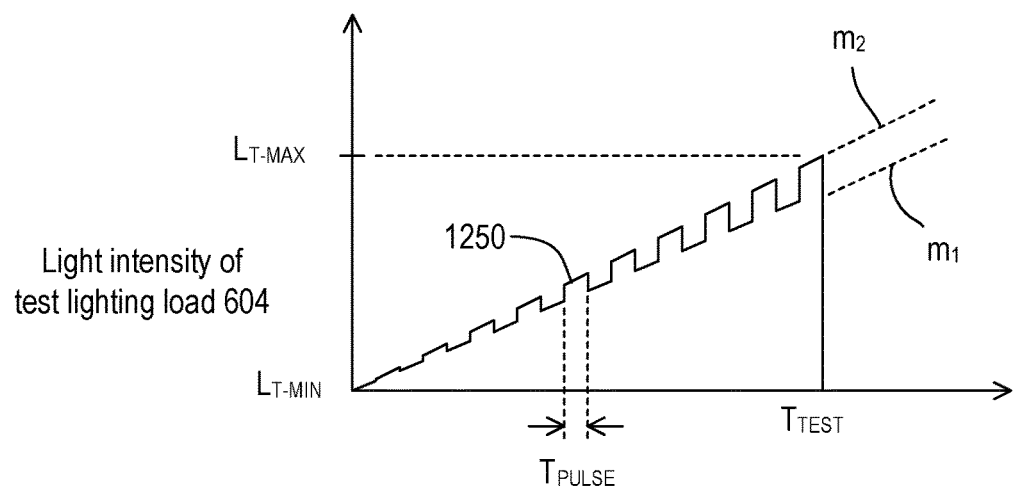
FIG. 16B is a plot of an example test waveform for the daylight sensor of FIG. 1 according to the fourth embodiment to be used in the test setup shown in FIG. 10B.

FIG. 16B is a plot of an example test waveform 1250 for the daylight sensor 120 of the fourth embodiment to be used in the test setup 650 shown in FIG. 10B. The test waveform 1250 comprises a pulsed waveform added on top of a linear ramp waveform and has peaks and valleys, such that the text waveform models the total light intensity $L_{T\text{-}SNSR}$ as measured by the daylight sensor 120 on an intermittent-cloudy day. The test waveform 1250 has a minimum light intensity (during the valleys) that increases with respect to time at a first slope $m_1$, and a maximum light intensity (during the peaks) that increases with respect to time at a second slope $m_2$. Each of the peaks (during which the text waveform 1250 is at the maximum light intensity) have a length $T_{PULSE}$, which may be approximately five seconds. The magnitude of the test waveform 1250 during the valleys is approximately 15% of the magnitude of the test waveform during the peaks.

When the test waveform 1250 is used in the test setup 650 to control the test lighting load 604, the daylight sensor 120 of the fourth embodiment will not transmit digital messages in response to the temporary excursions of the light intensity during the peaks. Accordingly, the rate of transmission of the daylight sensor 120 of the fourth embodiment will remain constant at a rate determined by the slope $m_1$ of the valleys.

As described above, the controller 230 of the daylight sensor 120 of the first, second, third, and fourth embodiments collects the predetermined number $N_{SMPL}$ of measurements of the total light intensity $L_{T\text{-}SNSR}$ during consecutive non-overlapping time intervals, and only analyzes the measurements at the end of each time interval (i.e., as determined by the predetermined time period $T_{WIN}$). Alternatively, the controller 230 could analyze the measurements of the total light intensity $L_{T\text{-}SNSR}$ in a sliding window time interval. Specifically, the controller 230 could store each new measurement of the total light intensity $L_{T\text{-}SNSR}$ in a first-in, first-out (FIFO) register (e.g., having a size equal to the predetermined number $N_{SMPL}$ of measurements). The controller 230 could then analyze the data stored in the FIFO registered each time that the controller samples the total light intensity control signal $V_{TOT}$.

In addition, the controller 230 of the daylight sensor 120 transmits digital messages including one or more values representative of the measured total light intensity $L_{T\text{-}SNSR}$ according to the first, second, third, and fourth embodiments. According to a fifth embodiment of the present invention, each digital message transmitted by the daylight sensor 120 to the dimmer switch 110 may alternatively comprise a command, such as a specific new light intensity $L_{NEW}$ for the lighting load 104. The controller 230 of the daylight sensor 120 determines the new intensity levels $L_{NEW}$ in response to the measured total light intensity $L_{T\text{-}SNSR}$. The dimmer switch 110 controls the present light intensity $L_{PRES}$ of the lighting load 104 to the new light intensity $L_{NEW}$ in response to receiving a digital message with a command from the daylight sensor 120.

According to the fifth embodiment, each time the controller 230 of the daylight sensor 120 samples the total light intensity control signal $V_{TOT}$, the controller 230 calculates a new dimming percentage $d_{NEW}$, which may be transmitted to the dimmer switch 110. As in the previous embodiments, the new dimming percentage $d_{NEW}$ may be a number between zero and one, which is representative of the new light intensity $L_{NEW}$ for the lighting load 104. The controller 214 of the dimmer switch 110 is operable to determine the light intensity $L_{NEW}$ from the new dimming percentage $d_{NEW}$ received from the daylight sensor 120, for example, by applying the new dimming percentage $d_{NEW}$ to different dimming curves depending upon the load type of the lighting load. The controller 230 of the daylight sensor 120 only transmits digital messages to the dimmer switch 110 when the new dimming percentage $d_{NEW}$ is outside a deadband, i.e., only when a change to the present light intensity $L_{PRES}$ of the lighting load 104 is required. Accordingly, the daylight sensor 120 only transmits digital messages to the dimmer switch 110 using a variable transmission rate that is dependent upon the measured total light intensity $L_{T\text{-}SNSR}$.

In addition, the controller 230 may also store a historical record of the total light intensity $L_{T\text{-}SNSR}$ as measured by the daylight sensor 120 each time the controller samples the total light intensity control signal $V_{TOT}$. The controller 230 is operable to determine when it is daytime and nighttime in response to the total light intensity control signal $V_{TOT}$ and the historical record stored in the memory 246. The controller 230 may increase the length of the sampling period $T_{SMPL}$ (e.g., to approximately three seconds) during the nighttime, such that the controller samples the total light intensity control signal $V_{TOT}$ less frequently and consumes even less power.

Figure 17:
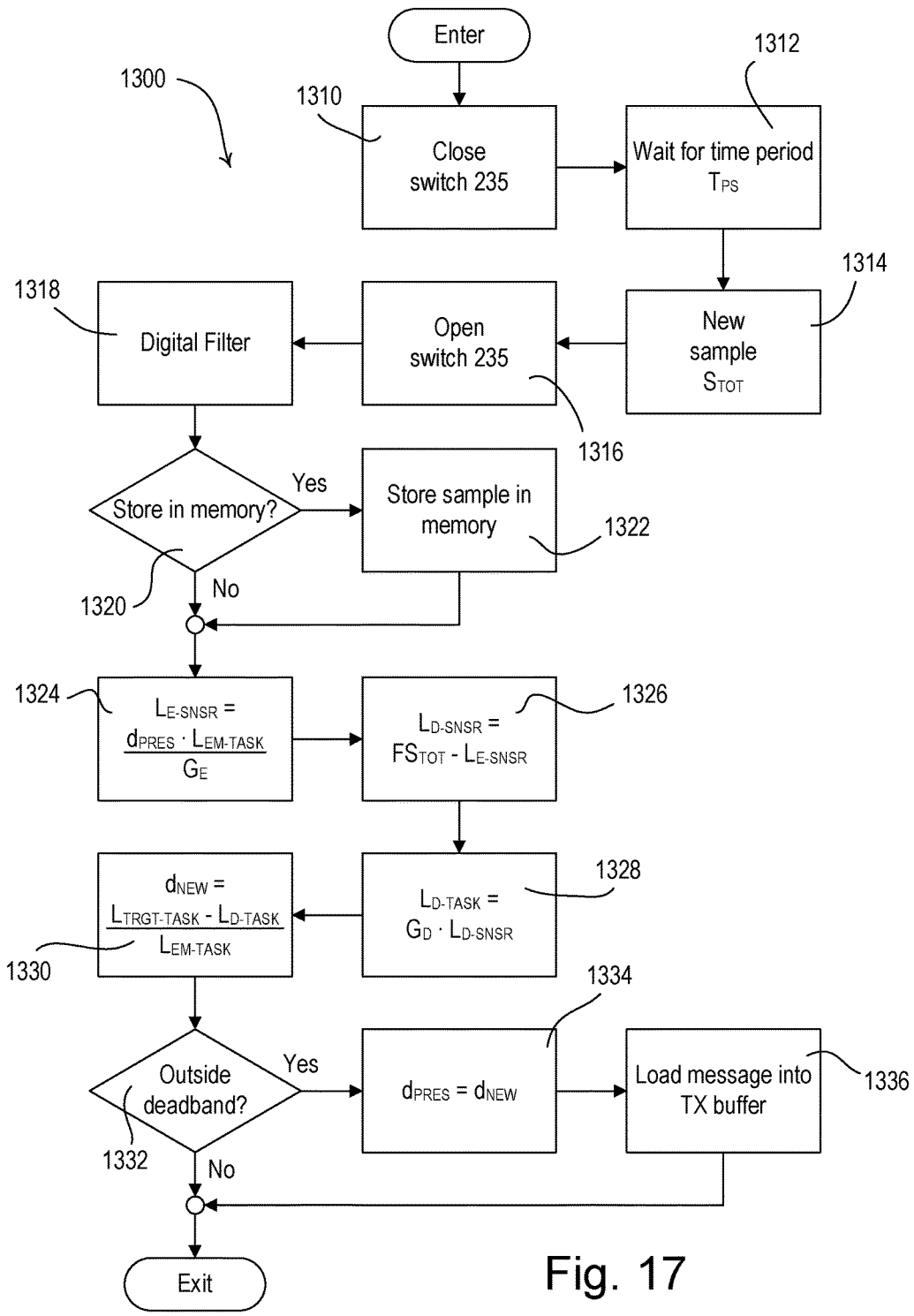
FIG. 17 is a simplified flowchart of a control procedure executed periodically by the controller of the daylight sensor of FIG. 1 according to a fifth embodiment of the present invention.

FIG. 17 is a simplified flowchart of a control procedure 1300 executed periodically (e.g., every one to three seconds) by the controller 230 of the daylight sensor 120 according to the fifth embodiment of the present invention. At step 1310, the controller 230 enables the photosensitive circuit 231 by closing the switch 235 using the photosensitive circuit enable control signal $V_{PS\_ENABLE}$. The controller 230 waits for the time period $T_{PD}$ (i.e., 50 msec) at step 1312 to allow the photosensitive diode current $I_{PD}$ to become representative of the total light intensity $L_{T\text{-}SNSR}$ at the daylight sensor 120. The controller 230 then samples the total light intensity control signal $V_{TOT}$ (using the ADC) to generate a new total light intensity sample $S_{TOT}$ at step 1314, and disables the photosensitive circuit 231 by opening the switch 235 using the photosensitive circuit enable control signal $V_{PS\_ENABLE}$ at step 1316. At step 1318, the total light intensity sample $S_{TOT}$ is applied to a digital filter (such as a linear predictor) to generate a filtered total light intensity sample $FS_{TOT}$.

The controller 230 is operable to periodically store the filtered total light intensity samples $FS_{TOT}$ (e.g., every 30 minutes) to create the historical record in the memory 246 of the total light intensity $L_{T\text{-}SNSR}$ at the daylight sensor 120. Specifically, if the controller 230 should store the present filtered total light intensity sample $FS_{TOT}$ at step 1320, the controller stores the present filtered total light intensity sample $FS_{TOT}$ in the memory 246 at step 1322.

Next, the controller 230 uses the filtered total light intensity sample $FS_{TOT}$ and a present dimming percentage $d_{PRES}$ to determine the new dimming percentage $d_{NEW}$ for the lighting load 104 using similar calculations as the receive procedure 500 of the first embodiment. Specifically, the controller 230 calculates the light intensity $L_{E\text{-}SNSR}$ measured by the daylight sensor 120 from only the lighting load 104 at step 1324, calculates the light intensity $L_{D\text{-}SNSR}$ at the daylight sensor 120 from only natural light at step 1326, calculates the light intensity $L_{D\text{-}TASK}$ on the task surface from only daylight at step 1328, and calculates the new dimming percentage $d_{NEW}$ at step 1330.

At step 1332, the controller 230 determines if the new dimming percentage $d_{NEW}$ is outside of a deadband, e.g., $$d_{PRES} - \Delta < d_{NEW} < d_{PRES} + \Delta, \qquad \text{(Equation 13)}$$

where $\Delta$ represents a predetermined increment by which the new dimmer percentage $d_{NEW}$ must differ from the present dimming percentage $d_{PRES}$ before the daylight sensor 120 will transmit a digital message to the dimmer switch 110 causing the dimmer switch to adjust the intensity of the lighting load 104 to the new intensity $L_{NEW}$. For example, the predetermined increment $\Delta$ may be approximately 1%. If the new dimming percentage $d_{NEW}$ is within the deadband at step 1332, the control procedure 1300 simply exits. However, if the new dimming percentage $d_{NEW}$ is outside the deadband at step 1332, the controller 230 stores the new dimming percentage $d_{NEW}$ as the present dimming percentage $d_{PRES}$ at step 1334. The controller 230 loads a digital message (including a command to control the intensity of the lighting load 104 according to the new dimming percentage $d_{NEW}$) into a transmit (TX) buffer at step 1336, before the control procedure 1300 exits.

A lighting control systems including wired daylight sensors (i.e., wired photosensors) is described in greater detail in U.S. Pat. No. 7,369,060, issued May 6, 2008, entitled DISTRIBUTED INTELLIGENCE BALLAST SYSTEM AND EXTENDED LIGHTING CONTROL PROTOCOL, the entire disclosures of which is hereby incorporated by reference.

While the present invention has been described with reference to the dimmer switch 110 for controlling the intensity of the lighting load 104, the concepts of the present invention could be applied to load control systems comprising other types of load control devices, such as, for example, fan-speed controls for fan motors, electronic dimming ballasts for fluorescent loads, and drivers for light-emitting diodes (LEDs). Further, the concepts of the present invention could be used to control other types of electrical loads, such as, for example, fan motors or motorized window treatments.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A sensor for measuring a light intensity, the sensor comprising:
   a photosensitive circuit configured to generate a light intensity control signal in response to the light intensity;
   a wireless transceiver configured to transmit and receive wireless signals;
   a laser pointer circuit configured to be exposed to light from a laser pointer;
   a controller coupled to the photosensitive circuit, the wireless transceiver, and the laser pointer circuit, the controller configured to transmit a wireless signal in response to the light intensity control signal; and
   a battery for powering the photosensitive circuit, the wireless transceiver, the laser pointer circuit, and the controller;
   wherein the controller is configured to enter a sleep mode in which the controller consumes less power, the controller further configured to enable the wireless transceiver in response to the laser pointer circuit being exposed to light from a laser pointer and to receive a wireless signal while the wireless transceiver is enabled and wherein the controller is configured to enable the wireless transceiver as part of an interrupt procedure after waking up from the sleep mode.

2. The sensor of claim 1, wherein the laser pointer circuit is electrically coupled to an interrupt pin on the controller to wake up the controller from the sleep mode in response to the laser pointer circuit being exposed to light from the laser pointer.

3. The sensor of claim 2, wherein the controller is configured to enable the wireless transceiver as part of an interrupt procedure after waking up from the sleep mode.

4. The sensor of claim 1, wherein the controller is configured to periodically sample the light intensity control signal to generate sampled light intensity values, the controller configured to analyze the sampled light intensity values to determine an amount of change of the light intensity, the controller configured to transmit wireless signals using a variable transmission rate that is dependent upon the amount of change of the light intensity.

5. The sensor of claim 4, wherein the controller is configured to determine at least one predicted light intensity value and calculate an error between the sampled light intensity values and the at least one predicted light intensity value, the controller configured to transmit a wireless signal including a value representative of the light intensity if the error is too great.

6. The sensor of claim 5, wherein the controller is configured to enable the wireless transceiver to transmit the wireless signal after determining that the error is too great, subsequently transmit the wireless signal including the value representative of the light intensity if the error is too great, and disable the wireless transceiver after transmitting the wireless signal.

7. The sensor of claim 1, wherein the controller is operable to enable the photosensitive circuit and subsequently sample the light intensity control signal at a sampling period, the controller further configured to disable the photosensitive circuit after the light intensity control signal has been sampled so that the photosensitive circuit does not draw current from the battery.

8. The sensor of claim 1, further comprising:
   an enclosure for housing the photosensitive circuit, the wireless transceiver, the laser pointer circuit, and the controller, the enclosure having an opening through which the laser pointer circuit is configured to receive the light from the laser pointer.

9. The sensor of claim 8, wherein the laser pointer circuit comprises a laser-responsive element responsive to energy received from the laser pointer through the opening in the enclosure.

10. The sensor of claim 9, wherein the laser-responsive element comprises a light-emitting diode.

11. The sensor of claim 1, wherein the controller is configured to disable the wireless transceiver after receiving the wireless signal.

12. The sensor of claim 1, wherein the controller is configured to disable the wireless transceiver if a wireless signal is not received within a timeout period after the laser pointer circuit was exposed to the light from the laser pointer.

13. A sensor for measuring a light intensity, the sensor comprising:
   a photosensitive circuit configured to generate a light intensity control signal in response to the light intensity;
   a wireless transceiver configured to transmit and receive wireless signals;
   a laser pointer circuit including a laser-responsive element responsive to laser energy received by the wireless sensor; and
   a controller configured to transmit a wireless signal in response to the light intensity control signal, the controller configured to enable the wireless transceiver in response to laser energy received by the laser-responsive element and to receive a wireless signal while the wireless transceiver is enabled;
   wherein the laser pointer circuit is electrically coupled to an interrupt pin on the controller to wake up the controller from a sleep mode in response to the laser-responsive element receiving the laser energy and wherein the controller is configured to enable the wireless transceiver as part of an interrupt procedure after waking up from the sleep mode.

14. The sensor of claim 13, further comprising:
   an enclosure for housing the photosensitive circuit, the wireless transceiver, the laser-responsive element, and the controller, the enclosure having an opening through which the laser-responsive element is configured to receive laser energy.

15. The sensor of claim 13, wherein the controller is configured to disable the wireless transceiver if a wireless signal is not received within a timeout period after the laser-responsive element received the laser energy.

16. A sensor comprising: a photosensitive circuit configured to generate a light intensity control signal in response to the light intensity; wherein the controller is configured to transmit a wireless signal in response to the light intensity control signal

- a wireless transceiver configured to transmit and receive wireless signals;
- a laser pointer circuit configured to be exposed to light from a laser pointer; and
- a controller coupled to the wireless transceiver and comprising an interrupt pin coupled to the laser pointer circuit, the controller configured to wake up from a sleep mode and enable the wireless transceiver in response to the laser pointer circuit being exposed to light from a laser pointer, the controller further configured to receive a wireless signal while the wireless transceiver is enabled wherein the controller is configured to enable the wireless transceiver as part of an interrupt procedure after waking up from the sleep mode.

* * * * *